US012625907B2

(12) United States Patent
Malmaud et al.

(10) Patent No.: US 12,625,907 B2
(45) Date of Patent: *May 12, 2026

(54) ENTITY CARDS INCLUDING DESCRIPTIVE CONTENT RELATING TO ENTITIES FROM A VIDEO

(71) Applicant: Google LLC, Mountain View, CA (US)

(72) Inventors: Jonathan Matthew Malmaud, Campbell, CA (US); Nicolas Paul-Stringall Higuera, Davis, CA (US); Jeff Hsu, Milpitas, CA (US); Sarah Fay Smith, San Francisco, CA (US); Gabriel Rubow Culbertson, Madison, WI (US); Runmin Zhao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,977

(22) Filed: Jul. 17, 2024

(65) Prior Publication Data

US 2024/0370494 A1 Nov. 7, 2024

Related U.S. Application Data

(63) Continuation of application No. 18/091,837, filed on Dec. 30, 2022, now Pat. No. 12,072,934.

(Continued)

(51) Int. Cl.
*G06F 16/783* (2019.01)
*H04N 21/4722* (2011.01)

(52) U.S. Cl.
CPC ...... *G06F 16/7844* (2019.01); *G06F 16/7837* (2019.01); *H04N 21/4722* (2013.01)

(58) Field of Classification Search
CPC .................................................. G06F 16/7844
(Continued)

(56) References Cited

U.S. PATENT DOCUMENTS

2008/0140385 A1 6/2008 Mahajan et al.
2009/0030940 A1 1/2009 Brezina et al.
(Continued)

FOREIGN PATENT DOCUMENTS

WO WO 2002/011446 2/2002

OTHER PUBLICATIONS

International Preliminary Report on Patentability for Application No. PCT/US2023/021889, mailed on Nov. 28, 2024, 9 pages.
(Continued)

*Primary Examiner* — Baoquoc N To
(74) *Attorney, Agent, or Firm* — DORITY & MANNING P.A.

(57) ABSTRACT

A computer-implemented method includes: receiving a video and implementing one or more machine-learned models to: identify a plurality of entities from the video, rank the plurality of entities, and generate, based on the rank of the plurality of entities, a first entity card which includes descriptive content relating to a first entity from among the plurality of entities. The first entity corresponds to one or more entities which are ranked highest among the plurality of entities. The method further includes: providing, for presentation on a display device, the video; and providing, for presentation on the display device while the video is being played, the first entity card, in response to the first entity being mentioned in the video.

20 Claims, 13 Drawing Sheets

Related U.S. Application Data

(60) Provisional application No. 63/341,674, filed on May 13, 2022.

(58) Field of Classification Search
USPC .......................................................... 707/749
See application file for complete search history.

(56) References Cited

U.S. PATENT DOCUMENTS

| | | | |
|---|---|---|---|
| 2015/0095938 A1 | 4/2015 | Xiong et al. | |
| 2015/0370859 A1 | 12/2015 | Bakir et al. | |
| 2017/0104957 A1* | 4/2017 | Farrell ................... | H04N 7/147 |
| 2017/0303010 A1 | 10/2017 | Vehovsky et al. | |
| 2019/0208372 A1* | 7/2019 | Yan .......................... | H04W 4/21 |
| 2019/0351331 A1 | 11/2019 | Betzel et al. | |
| 2023/0034073 A1* | 2/2023 | Chae ................... | H02J 7/00712 |
| 2023/0177369 A1* | 6/2023 | Hamilton ............... | G06N 20/00 |
| | | | 706/12 |
| 2023/0306205 A1* | 9/2023 | Maeder ............... | G06F 16/3344 |
| 2024/0346906 A1* | 10/2024 | Gorsuch ............ | G08B 21/0446 |

OTHER PUBLICATIONS

International Search Report and Written Opinion for Application No. PCT/US2023/021889, mailed on Jul. 27, 2023, 14 pages.

* cited by examiner

4000''

4094

4092

800

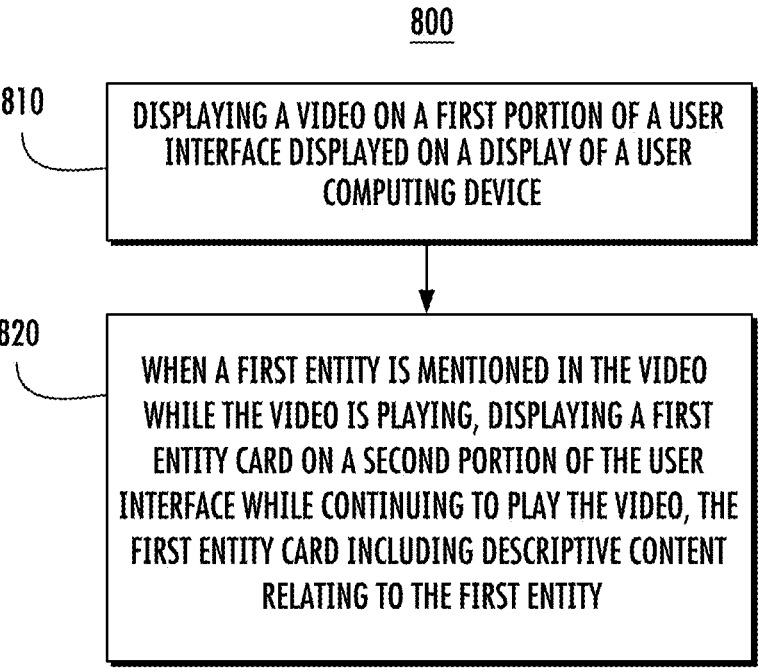

810

DISPLAYING A VIDEO ON A FIRST PORTION OF A USER INTERFACE DISPLAYED ON A DISPLAY OF A USER COMPUTING DEVICE

820

WHEN A FIRST ENTITY IS MENTIONED IN THE VIDEO WHILE THE VIDEO IS PLAYING, DISPLAYING A FIRST ENTITY CARD ON A SECOND PORTION OF THE USER INTERFACE WHILE CONTINUING TO PLAY THE VIDEO, THE FIRST ENTITY CARD INCLUDING DESCRIPTIVE CONTENT RELATING TO THE FIRST ENTITY

FIG. 8

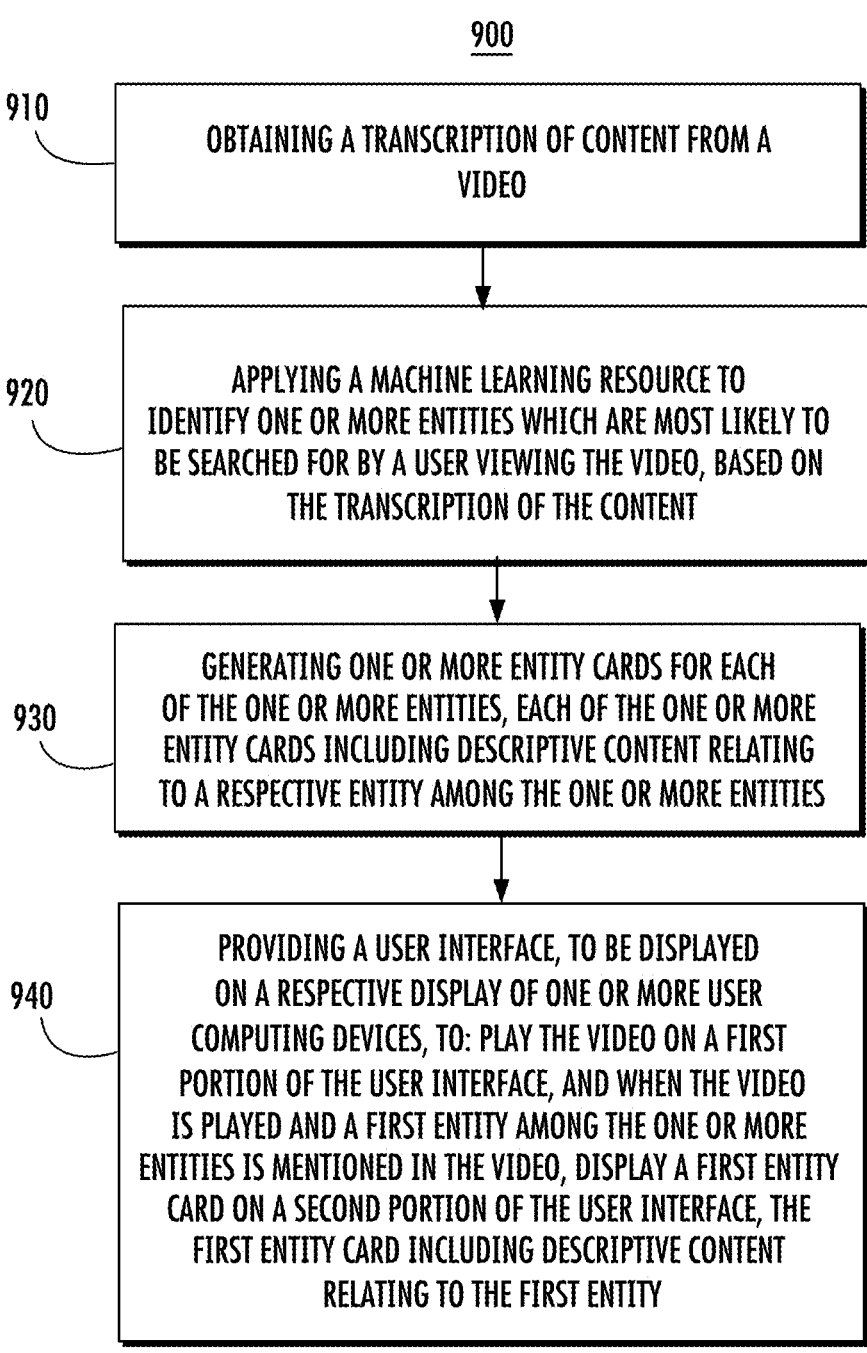

900

910

OBTAINING A TRANSCRIPTION OF CONTENT FROM A VIDEO

920

APPLYING A MACHINE LEARNING RESOURCE TO IDENTIFY ONE OR MORE ENTITIES WHICH ARE MOST LIKELY TO BE SEARCHED FOR BY A USER VIEWING THE VIDEO, BASED ON THE TRANSCRIPTION OF THE CONTENT

930

GENERATING ONE OR MORE ENTITY CARDS FOR EACH OF THE ONE OR MORE ENTITIES, EACH OF THE ONE OR MORE ENTITY CARDS INCLUDING DESCRIPTIVE CONTENT RELATING TO A RESPECTIVE ENTITY AMONG THE ONE OR MORE ENTITIES

940

PROVIDING A USER INTERFACE, TO BE DISPLAYED ON A RESPECTIVE DISPLAY OF ONE OR MORE USER COMPUTING DEVICES, TO: PLAY THE VIDEO ON A FIRST PORTION OF THE USER INTERFACE, AND WHEN THE VIDEO IS PLAYED AND A FIRST ENTITY AMONG THE ONE OR MORE ENTITIES IS MENTIONED IN THE VIDEO, DISPLAY A FIRST ENTITY CARD ON A SECOND PORTION OF THE USER INTERFACE, THE FIRST ENTITY CARD INCLUDING DESCRIPTIVE CONTENT RELATING TO THE FIRST ENTITY

FIG. 9

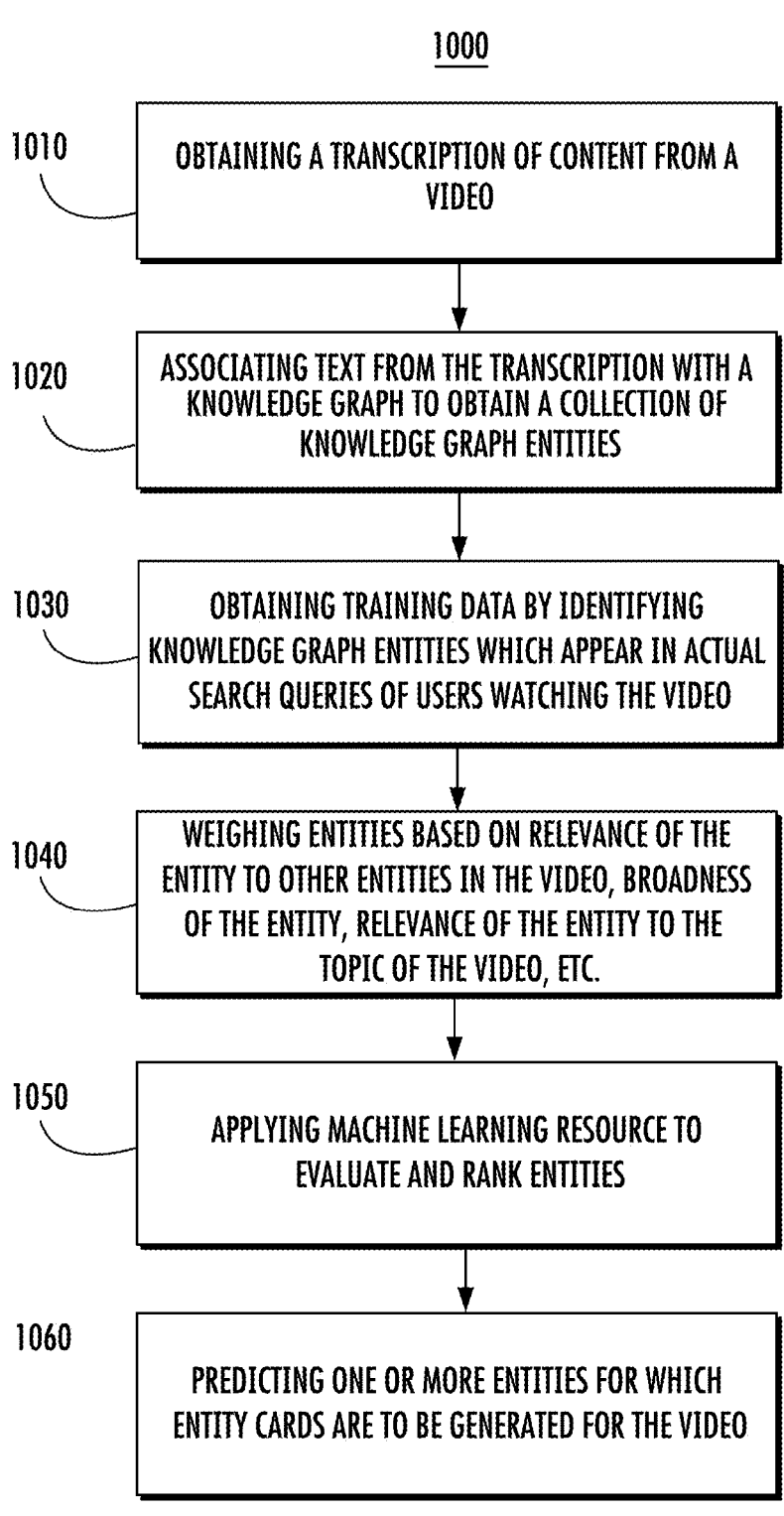

1000

1010 — OBTAINING A TRANSCRIPTION OF CONTENT FROM A VIDEO

1020 — ASSOCIATING TEXT FROM THE TRANSCRIPTION WITH A KNOWLEDGE GRAPH TO OBTAIN A COLLECTION OF KNOWLEDGE GRAPH ENTITIES

1030 — OBTAINING TRAINING DATA BY IDENTIFYING KNOWLEDGE GRAPH ENTITIES WHICH APPEAR IN ACTUAL SEARCH QUERIES OF USERS WATCHING THE VIDEO

1040 — WEIGHING ENTITIES BASED ON RELEVANCE OF THE ENTITY TO OTHER ENTITIES IN THE VIDEO, BROADNESS OF THE ENTITY, RELEVANCE OF THE ENTITY TO THE TOPIC OF THE VIDEO, ETC.

1050 — APPLYING MACHINE LEARNING RESOURCE TO EVALUATE AND RANK ENTITIES

1060 — PREDICTING ONE OR MORE ENTITIES FOR WHICH ENTITY CARDS ARE TO BE GENERATED FOR THE VIDEO

FIG. 10

ENTITY CARDS INCLUDING DESCRIPTIVE CONTENT RELATING TO ENTITIES FROM A VIDEO

CROSS-REFERENCE TO RELATED APPLICATIONS

This application is a continuation of U.S. application Ser. No. 18/091,837 having a filing date of Dec. 30, 2022, which is based on and claims priority to U.S. Provisional Application 63/341,674 having a filing date of May 13, 2022. Applicant claims priority to and the benefit of each of such applications and incorporates all such applications herein by reference in their entirety for all purposes.

FIELD

The disclosure relates generally to providing entity cards for a user interface in association with a video displayed on a display of a user computing device. More particularly, the disclosure relates to providing entity cards which assist in the understanding of the contents of the video and include descriptive content relating to an entity (e.g., a concept, a term, a topic, and the like) which is mentioned in the video.

BACKGROUND

When users watch a video, for example on a challenging or a new topic, there may be keywords or concepts that the user is not familiar with, but are helpful to understanding the content of the video. For example, in a video about the Egyptian pyramids, the term "sarcophagus" may be an important concept which is discussed extensively. However, a user not familiar with the term "sarcophagus" may not fully understand the content of the video. The user may pause the video and navigate to a search page to perform a search for the term "sarcophagus." In some instances, the user may have difficulty spelling the term which they wish to search for and may not obtain accurate search results or may experience inconvenience in searching. In other instances, the user may stop watching the video after finding the content of the video too difficult to understand.

SUMMARY

Aspects and advantages of embodiments of the disclosure will be set forth in part in the following description, or can be learned from the description, or can be learned through practice of the example embodiments.

In one or more example embodiments, a computer-implemented method for a server system includes obtaining a transcription of content from a video, applying a machine learning resource to identify one or more entities which are most likely to be searched for by a user viewing the video, based on the transcription of the content, generating one or more entity cards for each of the one or more entities, each of the one or more entity cards including descriptive content relating to a respective entity among the one or more entities, and providing a user interface, to be displayed on a respective display of one or more user computing devices, for: playing the video on a first portion of the user interface, and when the video is played and a first entity among the one or more entities is mentioned in the video, displaying a first entity card on a second portion of the user interface, the first entity card including descriptive content relating to the first entity.

In some implementations, applying the machine learning resource to identify the one or more entities includes obtaining training data to train the machine learning resource based on observational data of users conducting searches in response to viewing only the video.

In some implementations, applying the machine learning resource to identify the one or more entities includes identifying a plurality of candidate entities from the video by associating text from the transcription with a knowledge graph, and ranking the candidate entities to obtain the one or more entities, based on one or more of: a relevance of each of the candidate entities to a topic of the video, a relevance of each of the candidate entities to one or more other candidate entities among the plurality of candidate entities, a number of mentions of the candidate entity in the video, and a number of videos in which the candidate entity appears across a corpus of videos stored in one or more databases.

In some implementations, applying the machine learning resource to identify the one or more entities includes evaluating user interactions with the user interface, and determining at least one adjustment to the machine learning resource based on the evaluation of the user interactions with the user interface.

In some implementations, the first entity is mentioned in the video at a first timepoint in the video, and the first entity card is displayed on the second portion of the user interface at the first timepoint.

In some implementations, the one or more entities include a second entity and the one or more entity cards include a second entity card, and the method further includes providing the user interface, to be displayed on the respective display of the one or more user computing devices, for: displaying, on a third portion of the user interface while the continuing to play the video, the second entity card in a contracted form, the second entity card in the contracted form referencing the second entity to be mentioned in the video at a second timepoint in the video after the first timepoint, and when the second entity is mentioned in the video at the second timepoint, displaying on the third portion of the user interface while the continuing to play the video, the second entity card in a fully expanded form, the second entity card in the fully expanded form including descriptive content relating to the second entity.

In some implementations, the one or more entities include a second entity and the one or more entity cards include a second entity card, and the method further includes providing the user interface, to be displayed on the respective display of the one or more user computing devices, for: when the second entity is mentioned in the video while the video is playing, displaying the second entity card on the second portion of the user interface while continuing to play the video, the second entity card including descriptive content relating to the second entity, wherein the second entity card is displayed on the second portion of the display by replacing the first entity card at a time when the second entity is mentioned in the video.

In some implementations, the method further includes providing the user interface, to be displayed on the respective display of the one or more user computing devices, for: when the first entity is mentioned in the video while the video is playing, displaying a notification user interface element on a third portion of the user interface while continuing to play the video, the notification user interface element indicating additional information relating to the first entity is available, and in response to the first entity being mentioned in the video while the video is playing and in response to receiving a selection of the notification user interface element, displaying the first entity card on the second portion of the user interface while continuing to play the video.

In some implementations, the first entity card includes at least one of a textual summary providing information relating to the first entity or an image relating to the first entity.

In one or more example embodiments, a computer-implemented method for a user computing device, includes receiving a video for playback in a user interface, providing the video for display on a first portion of the user interface displayed on a display of the user computing device, and when a first entity is mentioned in the video while the video is playing: providing a first entity card for display on a second portion of the user interface while continuing to play the video, wherein the first entity card includes descriptive content relating to the first entity, and the first entity card has been generated in response to automatic recognition of the first entity from a transcription of content of the video.

In some implementations, the first entity is mentioned in the video at a first timepoint in the video, and the first entity card is provided for display on the second portion of the user interface at the first timepoint.

In some implementations, the method includes providing, for display on a third portion of the user interface, a contracted second entity card referencing a second entity to be mentioned in the video at a second timepoint in the video after the first timepoint, and when the second entity is mentioned in the video at the second timepoint, expanding the contracted second entity card to fully display the second entity card on the third portion of the user interface while the continuing to play the video, the second entity card including descriptive content relating to the second entity.

In some implementations, the method includes, when a second entity is mentioned in the video while the video is playing, providing a second entity card for display on the second portion of the user interface while continuing to play the video, the second entity card including descriptive content relating to the second entity, wherein the second entity card is provided for display on the second portion of the user interface by replacing the first entity card at a time when the second entity is mentioned in the video.

In some implementations, the method includes providing for display on the user interface, one or more entity search user interface elements that, when selected, are configured to perform a search relating to the first entity.

In some implementations the method includes providing for display on the user interface, one or more search query user interface elements that, when selected, are configured to perform a search relating to a topic of the video other than the first entity.

In some implementations the method includes utilizing a machine learning resource to identify the first entity and generate the first entity card.

In some implementations the first entity is an entity among a plurality of entities mentioned in the video that is determined by the machine learning resource as an entity most likely to be searched for by a user viewing the video among the plurality of entities mentioned in the video.

In some implementations the method includes, when the first entity is mentioned in the video while the video is playing, providing a notification user interface element for display on a third portion of the user interface while continuing to play the video, the notification user interface element indicating additional information relating to the first entity is available, and in response to receiving a selection of the notification user interface element, providing the first entity card for display on the second portion of the user interface while continuing to play the video.

In some implementations, the first entity card includes a textual summary providing information relating to the first entity and/or an image relating to the first entity.

In one or more example embodiments, a user computing device includes a display, one or more memories to store instructions, and one or more processors to execute the instructions stored in the one or more memories to: receive a video for playback in a user interface, provide the video for display on a first portion of the user interface displayed on the display, and when a first entity is mentioned in the video while the video is playing: provide a first entity card for display on a second portion of the user interface while continuing to play the video, wherein the first entity card includes descriptive content relating to the first entity, and the first entity card has been generated in response to automatic recognition of the first entity from a transcription of content of the video.

In one or more example embodiments, a server system includes one or more memories to store instructions, and one or more processors to execute the instructions stored in the one or more memories to: obtain a transcription of content from a video, apply a machine learning resource to identify one or more entities which are most likely to be searched for by a user viewing the video, based on the transcription of the content, generate one or more entity cards for each of the one or more entities, each of the one or more entity cards including descriptive content relating to a respective entity among the one or more entities, and provide a user interface, to be displayed on a respective display of one or more user computing devices, for: playing the video on a first portion of the user interface, and when the video is played and a first entity among the one or more entities is mentioned in the video, displaying a first entity card on a second portion of the user interface, the first entity card including descriptive content relating to the first entity.

In one or more example embodiments, a computer-readable medium (e.g., a non-transitory computer-readable medium) which stores instructions that are executable by one or more processors of a user computing device and/or a server system is provided. In some implementations the computer-readable medium stores instructions which may include instructions to cause the one or more processors to perform one or more operations of any of the methods described herein (e.g., operations of the server system and/or operations of the user computing device). The computer-readable medium may store additional instructions to execute other aspects of the server system and user computing device and corresponding methods of operation, as described herein.

These and other features, aspects, and advantages of various embodiments of the disclosure will become better understood with reference to the following description, in drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which:

FIGS. 8-10 each illustrate flow diagrams of example, non-limiting computer-implemented methods according to one or more example embodiments.

DETAILED DESCRIPTION

Figure 1:
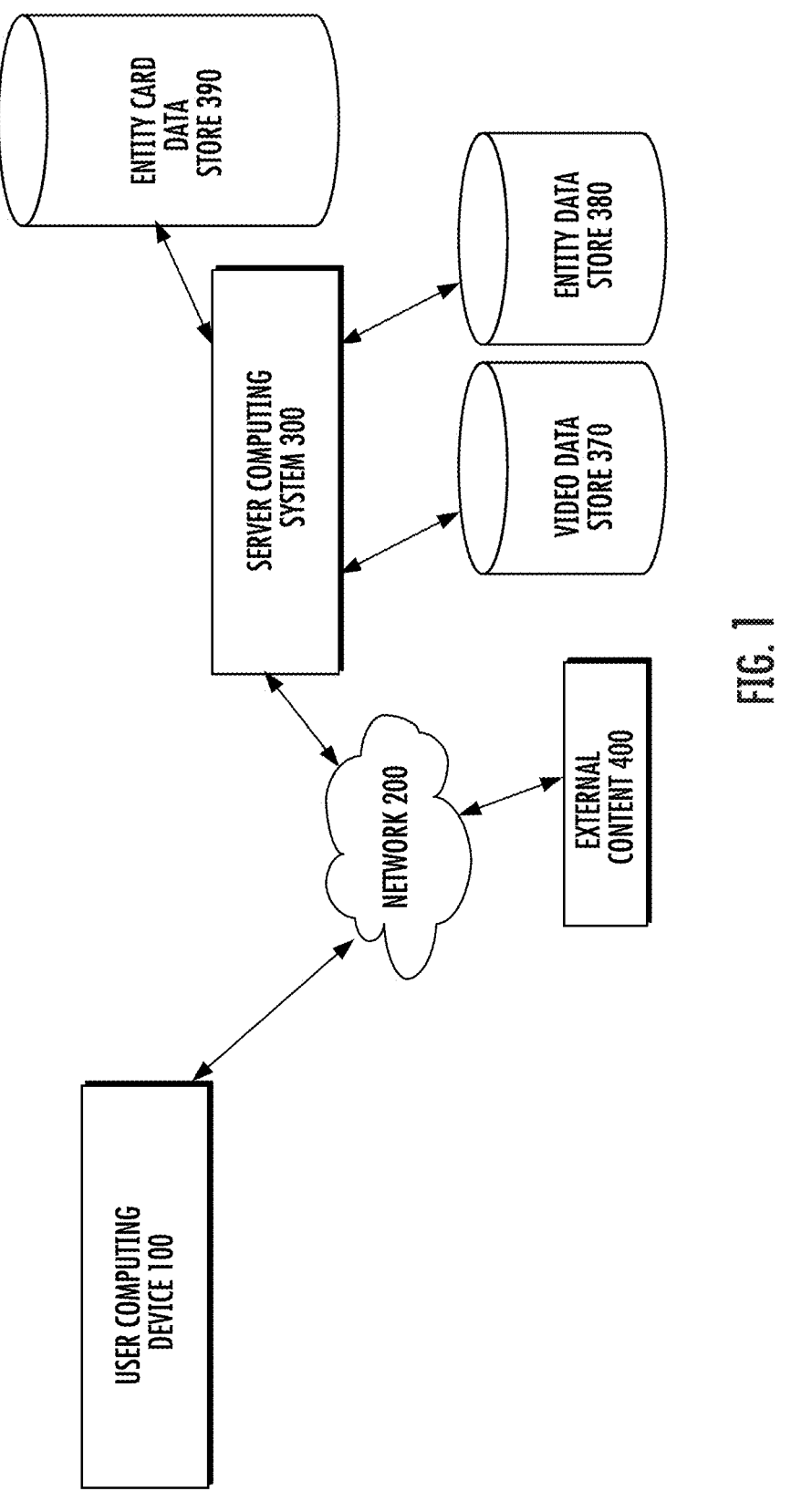
FIG. 1 depicts an example system according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

According to example embodiments, as a user watches a video on a user interface of a display of a user computing device and an entity (e.g., a concept, a term, a topic, and the like) is mentioned in the video, the user interface is provided with an entity card which includes information about the entity that may be helpful to the user's understanding of the content of the video. For example, if a user is watching a video about the Egyptian pyramids, an entity card may be provided to the user interface to provide further information about the term "sarcophagus," such as a definition of the term, a photo of a sarcophagus, and the like. The entity card is provided to the user interface while the video continues to play so that the user does not need to navigate away from the application or web page which plays the video in order to learn more about the entity (e.g., the term "sarcophagus"). Therefore, information about a potentially difficult concept or a concept which the user may want to know more about, may be presented to the user to help the user gain a quick understanding of the concept without leaving the application or web page which plays the video, and the user need not perform a separate search regarding the concept.

In some implementations, the entirety of the entity card may be visible on the user interface to the user or a portion of the entity card may be visible on the user interface and the user is able to select the portion of the entity card to expand the entity card to also see the hidden portion of the entity card for further information regarding the entity.

In some implementations, the entity card may be displayed on the user interface at a same time that the entity is mentioned in the video. That is, the display of the entity card is synchronized with a time that the entity is mentioned in the video. The entity card may be displayed on the user interface every time that the entity is mentioned in the video, only the first time the entity is mentioned in the video, or selectively displayed when the entity is mentioned a plurality of times in the video.

In some implementations, a user interface element separate from the entity card may be provided on the user interface to allow a user to perform a search with respect to the entity. For example if the user wishes to obtain further information about the entity beyond that which is provided in the entity card the user can select the user interface element which causes a search to be performed with respect to the entity and a search results page may be displayed on the display of the user computing device.

In some implementations, one or more user interface elements separate from the entity card may be provided on the user interface that correspond to respective suggested search queries. The one or more user interface elements allow a user to perform a search for information other than the entity itself, for example with respect to other entities or other topics covered in the video. For example if the user wishes to obtain further information about other entities or other topics covered in the video the user can select the corresponding user interface element which causes a search to be performed with respect to the corresponding entity or topic and a search results page may be displayed on the display of the user computing device.

In some implementations, there may be a plurality of concepts in a video which could potentially be difficult for the user to understand (or potentially be of interest to the user). According to example embodiments, entity cards for each of the plurality of concepts in the video may be displayed on the user interface as a user watches the video and the plurality of concepts are mentioned. For example, the user interface is provided with a separate entity card for each concept which includes information about the concept that may be helpful to the user's overall understanding of the content of the video. The entity cards are provided to the user interface while the video continues to play so that the user does not need to navigate away from the application or web page which plays the video. Therefore, information about potentially difficult concepts or concepts which the user may want to know more about, may be presented to the user to help the user gain a quick understanding of the concept without leaving the application or web page which plays the video, and the user need not perform a separate search regarding each of the concepts.

In some implementations, all of the entity cards associated with a video may be visible on the user interface to the user at a same time while the video is playing, or only some of the entity cards associated with the video may be visible on the user interface to the user at a same time while the video is playing. For example, one or more of the entity cards may be fully expanded so that a user can view the entire contents of the entity card, while some or all of the remaining entity cards may be displayed on the user interface in a contracted or hidden form. For example, in the contracted or hidden form, the user may view a portion of the entity card and the portion of the entity card may include some identifying information (e.g., an identification of the corresponding entity) so that the user is able to comprehend the relevance of the entity card. For example, the user is able to select the portion of the entity card to expand the entity card to also view the hidden portion of the entity card for further information regarding the entity.

In some implementations, entity cards associated with a video may be visible on the user interface to the user as the video progresses, and the user is not able to view an entity card until the corresponding entity is mentioned in the video. For example, a first entity card about a first entity may be displayed on the user interface at a time during the video when the first entity is mentioned in the video (e.g., at a first timepoint). The first entity card may be displayed for a predetermined amount of time while the video continues to play (e.g., for a time sufficient for an average user to read or view the content contained in the first entity card) or until a next entity is mentioned in the video at which point another entity card is provided on the user interface. For example, a second entity card about a second entity may be displayed on the user interface at a time during the video when the second entity is mentioned in the video (e.g., at a second timepoint).

In some implementations, the second entity card may be displayed on the user interface by replacing the first entity card (i.e., by occupying some or all of the space on the user interface which was previously occupied by the first entity card).

In some implementations, the second entity card may be in a contracted or hidden form and when the second entity is mentioned in the video at the second timepoint, the second entity card may be expanded to fully display the second entity card on the user interface. The first entity card may be changed to be in the contracted or hidden form at the time the second entity card is expanded if it is not already in the contracted or hidden form prior to the second entity card being displayed. In some implementations the first and second entity cards may each be fully displayed on the user interface.

In some implementations, when an entity is mentioned in the video while the video is playing, a notification user interface element is displayed on the user interface while continuing to play the video. For example, the notification user interface element indicates that additional information relating to the entity is available. In response to receiving a selection of the notification user interface element, an entity card is displayed on the user interface while continuing to play the video. The notification user interface element may include an image (e.g., a thumbnail image) of the entity to further make the user aware that the notification user interface element is associated with the entity and an entity card about the entity is available.

In some implementations, while the video is playing a timeline may be displayed on the user interface which indicates one or more timepoints along the timeline in which information about one or more entities is available via corresponding entity cards. As the video approaches or crosses each timepoint, a corresponding entity card is displayed on the user interface to provide information about the entity. For example, a user interface element may be provided which, when selected, allows the entity cards to cycle through the user interface as the video progresses along the timeline.

According to example embodiments disclosed herein, one or more entity cards are provided to be displayed on the user interface of the display of a user computing device while a video is played, for one or more entities which are mentioned in the video. For example, the entities for which entity cards are provided may be identified from the video by using a machine learning resource. For example, an entity among a plurality of candidate entities mentioned in the video may be identified by the machine learning resource as an entity for which an entity card should be generated when the machine learning resource determines or predicts the entity is likely to be searched for by a user viewing the video (e.g., having a confidence value greater than a threshold value, a probability of being searched for greater than a threshold value, being determined as most likely to be searched for by a user viewing the video compared to other entities mentioned in the video, and the like). For example, the machine learning resource may select a candidate entity as an entity for which an entity card should be generated based on one or more of: a relevance of each of the plurality of candidate entities to a topic of the video, a relevance of each of the plurality of candidate entities to one or more other candidate entities among the plurality of candidate entities, a number of mentions of the candidate entity in the video, and a number of videos in which the candidate entity appears across a corpus of videos stored in one or more databases.

In accordance with example embodiments disclosed herein, a server system includes one or more servers which provide the video and the entity cards for display on the user interface of the display of the user computing device.

According to examples disclosed herein, entity cards are generated based on entities which are identified from the video. For example, the video may be analyzed using speech recognition programs to perform automatic speech recognition and obtain a transcription (a text transcript) of the speech. A next operation may include associating some or all of the text from the transcription with knowledge graph entities to obtain a collection of knowledge graph entities associated with the video. Training data for a machine learning resource may be obtained based by identifying those knowledge graph entities which also appear in search queries from real users viewing the video. Additional operations for identifying entities from the video which may be important to the understanding of the video content and/or for identifying entities from the video which are likely to be searched for by a user, include determining how relevant an entity is to other entities in the video, determining how broad the entity is using a tf-idf (term frequency-inverse document frequency) signal across a corpus of videos, and determining how related the entity is to the topic of the video (e.g., using a query-based salient term signal). The machine learning resource may be trained by applying weights to candidate entities (e.g., a higher weight may be assigned to an entity the more often the term is mentioned in the video, a lower weight may be assigned to an entity which is overly broad and appears frequently in a corpus of videos, a higher weight may be assigned to an entity the more related it is to the topic of the video, etc.). The machine learning resource may be applied to evaluate candidate entities from among candidate entities identified in the video and to rank the candidate entities. For example, one or more of the highest ranked candidate entities may be selected as entities for which entity cards are to be generated.

To generate the entity card, information regarding the entity may be obtained from various sources to populate the entity card with text and/or image(s) which provide more information about the entity. For example, information regarding the entity may be obtained from one or more websites, an electronic service which provides summaries for topics, and the like.

In some implementations, the entity card may be limited to less than a predetermined length and/or size (e.g., less than 100 words). The entity card may include information including one or more of a title (e.g., a title which identifies the entity, such as the title of "Barack Obama"), a subtitle (e.g., "former President of the United States" with respect to the prior entity and title example of Barack Obama), and attribution information (to provide attribution to a source of the information). For example, an image may be limited to a thumbnail image size, a specified resolution, etc.

According to examples disclosed herein, a next operation includes rendering a user interface which is to be displayed on a display of a user computing device, the user interface including the video and the one or more entity cards associated with the video which may appear on the user interface at various points during the video or may be displayed (fully or partially) throughout the video.

For example, the machine learning resource may be updated or adjusted based on an evaluation of user interactions with the user interface. For example, if users generally do not interact with a particular entity card during the video, there may be an implication that the entity is not a term or topic users are interested in or do not understand with respect to the content of the video. Accordingly, the machine learning resource may be adjusted to reflect the user interactions (or lack thereof) with the user interface. Likewise, if users generally do interact with a particular entity card during the video, there may be an implication that the entity is a term or topic users are interested in or do not understand with respect to the content of the video. Accordingly, the machine learning resource may be adjusted to reflect the user interactions with the user interface.

The systems and methods of the disclosure provide a number of technical effects and benefits. In one example, the disclosure provides a way for users to easily understand or learn more about an entity (e.g., a term, concept, topic, etc.) associated with a video, and similarly, to easily identify content that the user may wish to consume in further detail. By providing such a user interface, the user is able to more quickly comprehend the entity without the need for performing a separate search and without the need for stopping the video and a user experience is improved. The user is also able to ascertain whether they are interested in learning more about the entity by performing a search for the entity after having been provided a brief summary (e.g., a snippet) and/or imagery regarding the entity via an entity card. In such fashion, the user is able to avoid performing a search for an entity, loading search results, and reading various content items that may or may not be relevant to the entity, which is more computationally expensive than simply reading information that is already presented, thereby conserving time, processing, memory, and network resources of the computing system (whether server device, client device, or both). Likewise, user convenience and experience is improved because the user is not discouraged by the complexity of the content of the video and the user will be more likely to watch the video in its entirety. User convenience and experience is also improved because the user is not discouraged by erroneous search results due to spelling errors, as a machine learning resource predicts entities that the user is likely to search for, and the information about the entity is automatically displayed during the video. Therefore, the user can avoid loading/viewing content from a search results page which again conserves processing, memory, and network resources of the computing system. User convenience and experience is also improved because the user avoids the inconvenience of switching between an application or web page which plays the video and a search results page, and instead the video can be continuously played without disruption while the entity cards are accessible or presented to the user during the video.

In some cases, systems of the type disclosed herein may learn through one or more various machine learning techniques (e.g., by training a neural network or other machine-learned model) a balance of the types of content items, perspectives, sources, and/or other attributes that are preferred, such as based on different types of content, different user populations, different contexts such as timing and location, etc. For example, data descriptive of actions taken by one or more users (e.g., "clicks," "likes," or similar) with respect to the user interface in various contextual scenarios can be stored and used as training data to train (e.g., via supervised training techniques) one or more machine-learned models to, after training, generate predictions which assist in providing content (e.g., entity cards) in the user interface which meets the one or more users' respective preferences. In such a way, system performance is improved with reduced manual intervention, providing fewer user searches and further conserving processing, memory, and network resources of the computing system (whether server device, client device, or both).

Referring now to the drawings, FIG. 1 is an example system according to one or more example embodiments of the disclosure. FIG. 1 illustrates an example of a system which includes a user computing device 100, a server computing system 300, video data store 370, entity data store 380, entity card data store 390, and external content 400, each of which may be in communication with one another over a network 200.

For example, the user computing device 100 can include any of a personal computer, a smartphone, a laptop, a tablet computer, and the like.

For example, the network 200 may include any type of communications network such as a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like.

For example, the server computing system 300 can include a server, or a combination of servers (e.g., a web server, application server, etc.) in communication with one another, for example in a distributed fashion.

In example embodiments, the server computing system 300 may obtain data or information from one or more of the video data store 370, entity data store 380, entity card data store 390, and external content 400. The video data store 370, entity data store 380, and entity card data store 390 may be integrally provided with the server computing system 300 (e.g., as part of the memory 320 of the server computing system 300) or may be separately (e.g., remotely) provided. Further, video data store 370, entity data store 380, and entity card data store 390 can be combined as a single data store (database), or may be a plurality of respective data stores. Data stored in one data store (e.g., the entity data store 380) may overlap with some data stored in another data store (e.g., the entity card data store 390). In some implementations, one data store (e.g., the entity card data store 390) may reference data that is stored in another data store (e.g., the entity data store 380).

Video data store 370 can store videos and/or information about videos. For example, video data store 370 may store a collection of videos. The videos may be stored, grouped, or classified in any fashion. For example, videos may be stored according to a genre or category, according to a title, according to a date (e.g., of creation or last modification, etc.), etc. Information about the videos may include location information (e.g., a uniform resource locator (URL)) regarding where a video may be stored or accessed. Information about the videos may include transcription information of the videos. For example, a computing system may be configured to perform automatic speech recognition (e.g., using one or more speech recognition programs) with respect to a video stored in the video data store 370 or stored elsewhere, to obtain a transcription (i.e., a textual transcript) of the video, and the textual transcript of the video may be stored in the video data store 370.

Entity data store 380 can store information about entities which are identified from textual transcripts of videos. The identification of entities within a video will be explained in more detail below. Entity cards may be created or generated for a video with respect to an entity that is identified from and the video and which may be stored in the entity data store 380. For example, the entities for which entity cards are provided may be identified from the video by using a machine learning resource. For example, an entity among a plurality of candidate entities mentioned in the video may be identified by the machine learning resource as an entity for which an entity card should be generated when the machine learning resource determines or predicts the entity is likely to be searched for by a user viewing the video (e.g., having a confidence value greater than a threshold value, a probability of being searched for greater than a threshold value, being determined as most likely to be searched for by a user viewing the video compared to other entities mentioned in the video, and the like). For example, the machine learning resource may select a candidate entity as an entity for which an entity card should be generated based on one or more of: a relevance of each of the plurality of candidate entities to a topic of the video, a relevance of each of the plurality of candidate entities to one or more other candidate entities among the plurality of candidate entities, a number of mentions of the candidate entity in the video, and a number of videos in which the candidate entity appears across a corpus of videos stored in one or more databases (e.g., video data store 370). For example, entities which may be identified from a video entitled "The myth of Icarus and Daedalus" may include "Greek mythology," "Crete," "Icarus," and "Daedalus." These entities may be stored in the entity data store 380, and may be associated with the video entitled "The myth of Icarus and Daedalus" which may be stored or referenced in the video data store 370.

Entity card data store 390 can store information about entity cards which are created or generated from entities which are identified from videos. The creation or generation of entity cards will be explained in more detail below. For example, the entity cards may be created or generated by obtaining information regarding the entity from various sources (e.g., from external content 400) to populate the entity card with text and/or image(s) which provide more information about the entity. For example, information regarding the entity may be obtained from one or more websites, an electronic service which provides summaries for topics, and the like. For example, entity cards stored in the entity card data store 390 may be limited to less than a predetermined length and/or size (e.g., less than 100 words). The entity cards stored in the entity card data store 390 may include information including one or more of a title (e.g., a title which identifies the entity, such as the title of "Barack Obama"), a subtitle (e.g., "former President of the United States" with respect to the prior entity and title example of Barack Obama), and attribution information (to provide attribution to a source of the information). For example, an image that forms part or all of the entity card may be limited to a thumbnail image size, a specified resolution, etc.

External content 400 can be any form of external content including news articles, webpages, video files, audio files, image files, written descriptions, ratings, game content, social media content, photographs, commercial offers, transportation methods, weather conditions, or other suitable external content. The user computing device 100 and server computing system 300 can access external content 400 over network 200. External content 400 can be searched by user computing device 100 and server computing system 300 according to known searching methods and search results can be ranked according to relevance, popularity, or other suitable attributes, including location-specific filtering or promotion.

With reference to FIG. 1, in an example embodiment a user of the user computing device 100 may transmit a request to view a video which is to be provided via the server computing system 300. For example, the video may be available through a video-sharing web site, an online video hosting service, a streaming video service, or other video platform. For example, the user may view the video on a display 160 of the user computing device via a video application 130 or a web browser 140. In response to receiving the request, the server computing system 300 is configured to provide a user interface, to be displayed on the display of the user computing device 100, for: playing the video on a first portion of the user interface, and when the video is played and a first entity among the one or more entities is mentioned in the video, displaying a first entity card on a second portion of the user interface, the first entity card including descriptive content relating to the first entity. FIGS. 4A through 7B, which will be discussed in more detail below, provide example user interfaces which illustrate the display of the video on a first portion of the user interface and the display of the first entity card on a second portion of the user interface. In some implementations, the server computing system 300 may store or retrieve the user interface including the video and the first entity card and provide the user interface in response to a request from the user computing device 100 to view the video. In some implementations, the server computing system 300 may store or retrieve the video and first entity card related to the video, dynamically generate the user interface including the video and the first entity card in response to a request from the user computing device 100 to view the video, and transmit the user interface to the user computing device 100. In some implementations, the server computing system 300 may store or retrieve the video, may store or retrieve one or more entities which have been identified from the video, dynamically generate one or more entity cards from the identified one or more entities, and dynamically generate the user interface including the video and one or more entity cards (e.g., including the first entity card) in response to a request from the user computing device 100 to view the video. In some implementations, the server computing system 300 may store or retrieve the video, dynamically identify one or more entities from the video (e.g., after transcribing the video or obtaining a transcript of the video), dynamically generate one or more entity cards from the identified one or more entities, and dynamically generate the user interface including the video and one or more entity cards (e.g., including the first entity card) in response to a request from the user computing device 100 to view the video.

Figure 2:
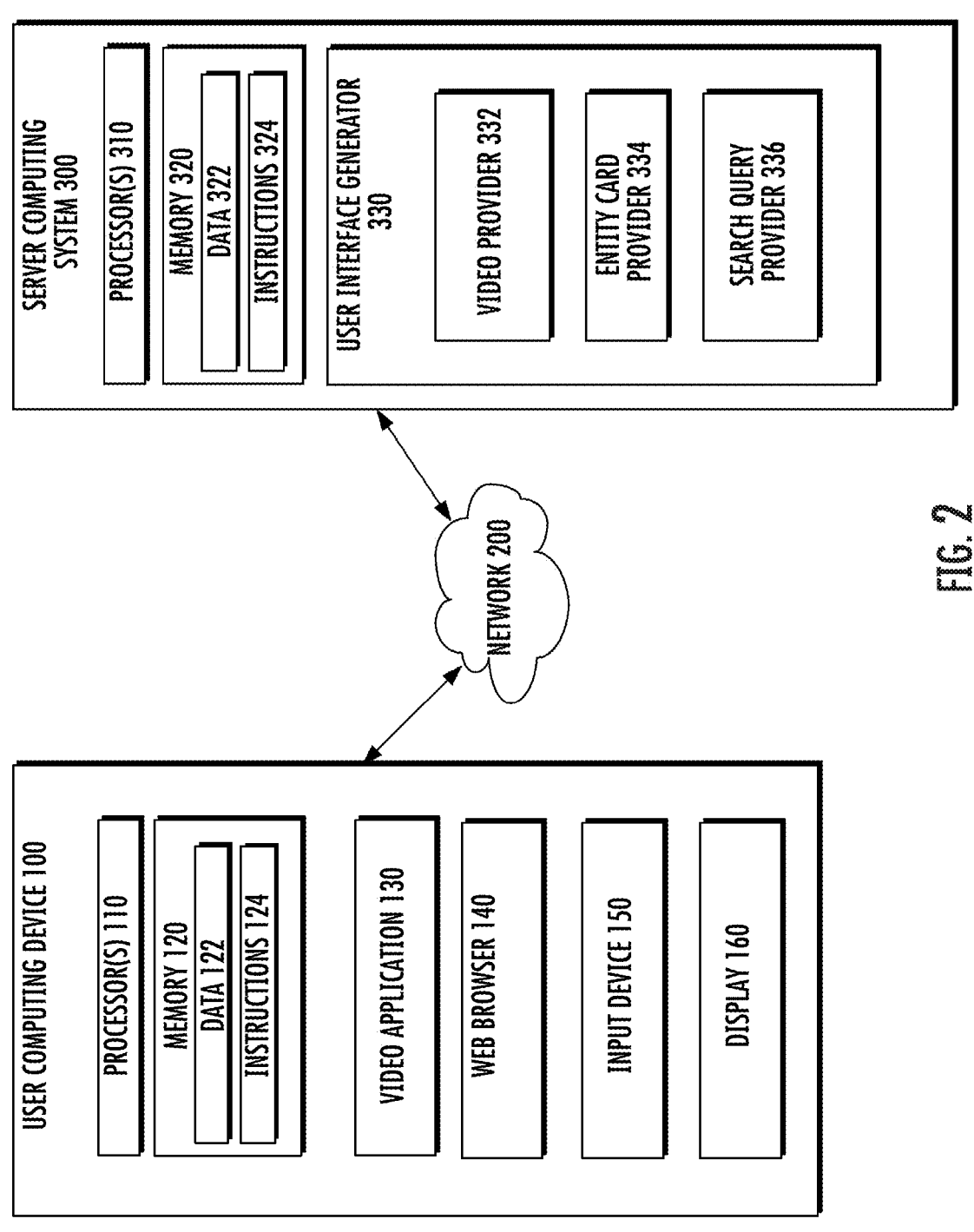
FIG. 2 depicts example block diagrams of a user computing device and server computing system according to one or more example embodiments of the disclosure.

Referring now to FIG. 2, example block diagrams of a user computing device and server computing system according to one or more example embodiments of the disclosure will now be described.

The user computing device 100 may include one or more processors 110, one or more memory devices 120, a video application 130, a web browser 140, an input device 150, and a display 160. The server computing system 300 may include one or more processors 310, one or more memory devices 320, and a user interface generator 330.

For example, the one or more processors 110, 310 can be any suitable processing device that can be included in a user computing device 100 or server computing system 300. For example, such a processor 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The memory 120, 320 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, and combinations thereof. However, examples of the memory 120, 320 are not limited to the above description, and the memory 120, 320 may be realized by other various devices and structures as would be understood by those skilled in the art.

For example, memory 120 can store instructions, that when executed, cause the one or more processors 110 to receive a video for playback in a user interface, provide the video for display on a first portion of the user interface displayed on the display, and when a first entity is mentioned in the video while the video is playing, provide a first entity card for display on a second portion of the user interface while continuing to play the video, as described according to examples of the disclosure. For example, memory 320 can store instructions, that when executed, cause the one or more processors 310 to provide a user interface, to be displayed on a respective display of one or more user computing devices, for: playing the video on a first portion of the user interface, and when the video is played and a first entity among the one or more entities is mentioned in the video, displaying a first entity card on a second portion of the user interface, as described according to examples of the disclosure.

Memory 120 can also include data 122 and instructions 124 that can be retrieved, manipulated, created, or stored by the one or more processor(s) 110. In some example embodiments, such data can be accessed and used as input to receive a video for playback in a user interface, provide the video for display on a first portion of the user interface displayed on the display, and when a first entity is mentioned in the video while the video is playing, provide a first entity card for display on a second portion of the user interface while continuing to play the video, as described according to examples of the disclosure. Memory 320 can also include data 322 and instructions 324 that can be retrieved, manipulated, created, or stored by the one or more processor(s) 310. In some example embodiments, such data can be accessed and used as input to provide a user interface, to be displayed on a respective display of one or more user computing devices, for: playing the video on a first portion of the user interface, and when the video is played and a first entity among the one or more entities is mentioned in the video, displaying a first entity card on a second portion of the user interface, as described according to examples of the disclosure.

In FIG. 2, the user computing device 100 includes a video application 130, which may also be referred to as a video player or a video streaming app. The video application 130 enables a user of the user computing device 100 to view a video which is provided through the application and displayed on a user interface of the display 160. For example, the video may be provided to the video application 130 via the server computing system 300.

In FIG. 2, the user computing device 100 includes a web browser 140, which may also be referred to as an internet browser or simply as a browser. The web browser 140 may be any browser which is used to access a website or web page (e.g., via the world wide web). A user of the user computing device 100 may provide an input (e.g., a URL) to the web browser 140 to obtain content (e.g., a video) and display the content on the display 160 of the user computing device. For example, the web browser's 140 rendering engine may display content on a user interface (e.g., a graphical user interface). For example, a video may be provided or obtained using the web browser 140 through a video-sharing web site, an online video hosting service, a streaming video service, or other video platform. For example, the video may be provided to the web browser 140 via the server computing system 300.

In FIG. 2, the user computing device 100 includes an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, a tablet PC, a pedal or footswitch, a virtual-reality device, and so on. The input device 150 may further include a haptic device to provide haptic feedback to a user. The input device 150 may also be embodied by a touch-sensitive display having a touchscreen capability, for example. The input device 150 may be used by a user of the user computing device 100 to provide an input to request to view a video, to provide an input selecting a user interface element displayed on the user interface, to input a search query, etc.

In FIG. 2, the user computing device 100 includes a display 160 which displays information viewable by the user, for example on a user interface (e.g., a graphical user interface). For example, the display 160 may be a non-touch sensitive display or a touch-sensitive display. The display 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays.

In accordance with example embodiments described herein, the server computing system 300 can include one or more processor(s) 310 and memory 320 which were previously discussed above. The server computing system 300 may also include a user interface generator 330. For example, the user interface generator 330 may include a video provider 332, entity card provider 334, and a search query provider 336. The user interface generator 330 may generate a user interface for display on the display 160 of the user computing device 100. The user interface may include various portions for displaying various content. For example, the user interface may display a video on a first portion of the user interface, an entity card on a second portion of the user interface, and various user interface elements at other portions of the user interface (e.g., a suggested search query on a third portion of the user interface).

The video provider 332 may include information or content (e.g., video content) which may be used to render the user interface so that the video can be displayed and played back at the user computer device 100. In some implementations, the video provider 332 may be configured to retrieve a video (e.g., in response to a request from the user computing device 100 for the video) from the video data store 370.

The entity card provider 334 may include information or content (e.g., an entity card including a textual summary and/or an image) which may be used to render the user interface so that the entity card can be displayed together with the video on the user interface at the user computer device 100. In some implementations, the entity card provider 334 may be configured to retrieve an entity card associated with the video from the entity card data store 390.

The search query provider 336 may include information or content (e.g., a suggested search query) which may be used to render the user interface so that the search query can be displayed together with at least one of the video or the entity card on the user interface at the user computer device 100. In some implementations, the search query provider 336 may generate one or more suggested search queries based on entities identified with respect to the video and/or based on the content of the entity card(s) associated with the video. For example, the search query provider 336 may generate suggested search queries based on previous user searches in response to watching the video, based on previous user searches regarding a topic of the video, and the like.

Additional aspects of the user computing device 100 and server computing system 300 will be discussed in view of the following illustrations shown in FIGS. 3 through 7B and the flow diagrams of FIGS. 8-10.

Figure 3:
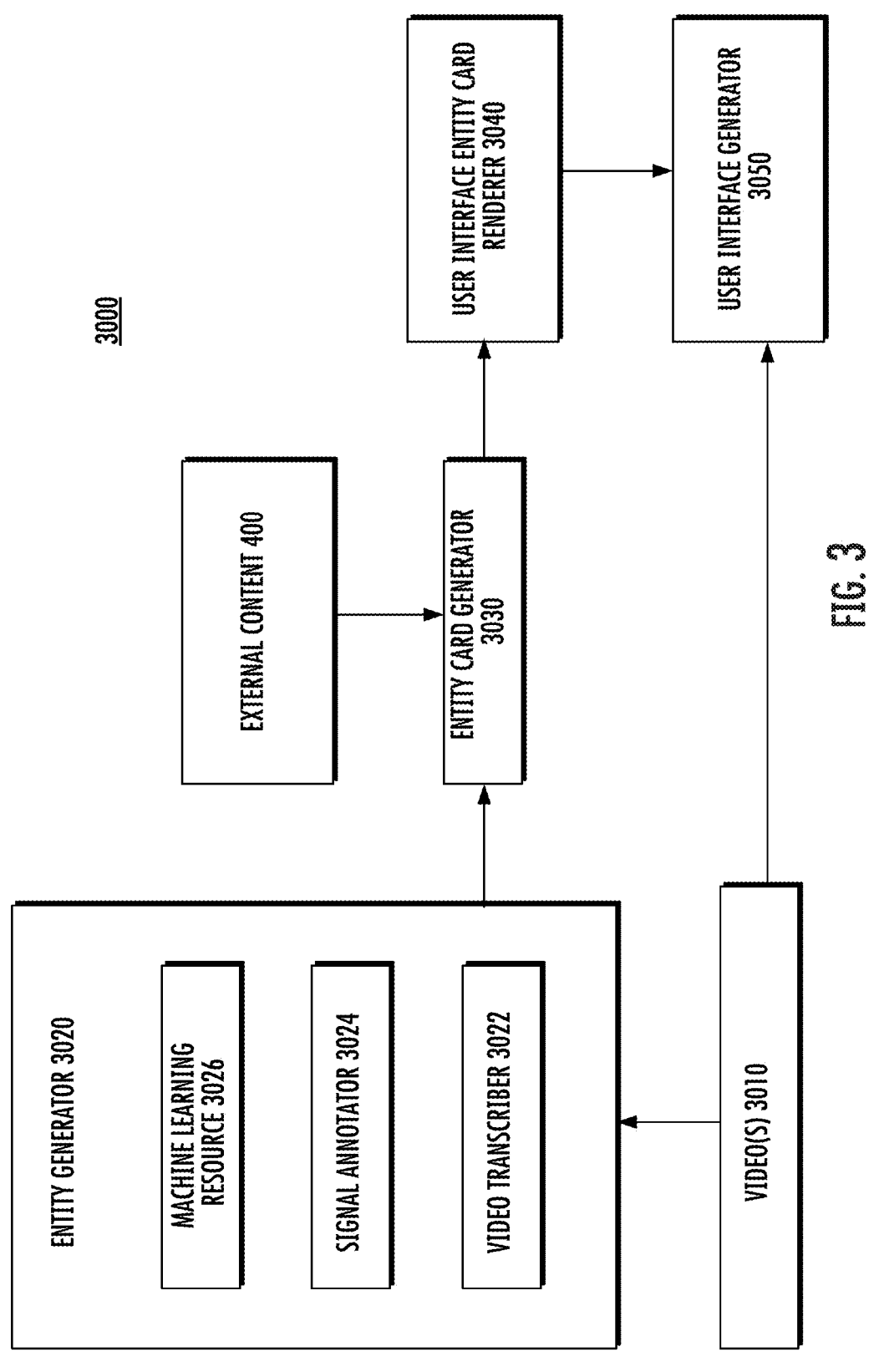
FIG. 3 depicts an example system for generating an entity card for a user interface, according to one or more example embodiments of the disclosure.

FIG. 3 depicts an example system 3000 for generating an entity card for a user interface, according to one or more example embodiments of the disclosure. The example system 3000 includes video 3010, entity generator 3020, external content 400, entity card generator 3030, user interface entity card renderer 3040, and user interface generator 3050. Each of the video 3010, entity generator 3020, entity card generator 3030, user interface entity card renderer 3040, and user interface generator 3050 may be part of the server computing system 300. In some implementations, the video 3010, entity generator 3020, entity card generator 3030, user interface entity card renderer 3040, and user interface generator 3050 may be part of the server computing system 300 (e.g., as part of a single server or distributed between a plurality of servers and/or data stores).

Referring to FIG. 3, entity cards may be generated based on entities which are identified from a video. For example, a video 3010 may be provided to entity generator 3020 for one or more entities to be identified from the video 3010. Video 3010 may be obtained from or stored in video data store 370, for example. Entity generator 3020 may include video transcriber 3022, signal annotator 3024, and machine learning resource 3026, for example. In some implementations, the video provider 332 may provide the video 3010 to the entity generator 3020 or a third-party application or service provider may provide the video 3010.

Video transcriber 3022 is configured to transcribe the video 3010. For example, video transcriber 3022 may include a speech recognition program which analyzes the video 3010 and performs automatic speech recognition to obtain a transcription (e.g., a text transcript) of the speech from the video 3010. In some implementations, the transcription of the video 3010 may be obtained from video data store 370 or from a third-party application or service provider which generates the transcription of the video, for example by automated speech recognition, and entity generator 3020 may not include the video transcriber 3022.

Signal annotator 3024 is configured to associate some or all of the text from the transcription obtained by video transcriber 3022 or video data store 370 with knowledge graph entities to obtain a collection of knowledge graph entities associated with the video 3010. A knowledge graph may generally refer to interlinked and/or interrelated descriptions between objects, events, situations, or concepts, for example in the form of a graph-structured data model.

Machine learning resource 3026 is configured to predict which entities from the video 3010 (e.g., which knowledge graph entities from the video 3010) are most likely to be searched for by a user viewing the video 3010 among the plurality of entities mentioned in or identified from the video (e.g., having a confidence value greater than a threshold value that a user might perform a search for the entity, a probability of being searched for greater than a threshold value, being determined as most likely to be searched for by a user viewing the video compared to other entities mentioned in the video, and the like). Training data for the machine learning resource 3026 may be obtained by identifying or matching those knowledge graph entities which also appear in search queries from real users viewing the video 3010.

The machine learning resource 3026 may be configured to identify entities from the video 3010 for which an entity card is to be generated by determining how relevant an entity is to other entities in the video 3010, determining how broad the entity is using a tf-idf (term frequency-inverse document frequency) signal across a corpus of videos (e.g., stored in the video data store 370), and determining how related the entity is to the topic of the video (e.g., using a query-based salient term signal). For example, the machine learning resource 3026 may select a candidate entity as an entity for which an entity card is to be generated based on one or more of: a relevance of each of the plurality of candidate entities to a topic of the video, a relevance of each of the plurality of candidate entities to one or more other candidate entities among the plurality of candidate entities, a number of mentions of the candidate entity in the video, and a number of videos in which the candidate entity appears across a corpus of videos stored in one or more databases (e.g., video data store 370), etc.

The machine learning resource 3026 may be trained by applying weights to candidate entities (e.g., a higher weight may be assigned to an entity the more often the term is mentioned in the video 3010, a lower weight may be assigned to an entity which is overly broad and appears frequently in the corpus of videos, a higher weight may be assigned to an entity the more related it is to the topic of the video, etc.). The machine learning resource 3026 may be configured to evaluate candidate entities from among candidate entities identified in the video 3010 and to rank the candidate entities. For example, the entity generator 3020 may be configured to select one or more of the highest ranked candidate entities identified by the machine learning resource 3026 as entities for which entity cards are to be generated. For example, an entity among a plurality of candidate entities mentioned in or identified from the video 3010 may be identified by the machine learning resource 3026 as an entity for which an entity card should be generated when the machine learning resource 3026 determines or predicts the entity is likely to be searched for by a user viewing the video 3010.

For example, the machine learning resource 3026 may be updated or adjusted based on an evaluation of user interactions with a user interface provided to the user computing device 100. For example, if users generally do not interact with a particular entity card while watching the video 3010, there may be an implication that the entity is not a term or topic users are interested in or do not understand with respect to the content of the video 3010. Accordingly, the machine learning resource 3026 may be adjusted to reflect the user interactions (or lack thereof) with the user interface. Likewise, if users generally do interact with a particular entity card while watching the video 3010, there may be an implication that the entity is a term or topic users are interested in or do not understand with respect to the content of the video 3010. Accordingly, the machine learning resource 3026 may be adjusted to reflect the user interactions with the user interface. For example, the machine learning resource 3026 may re-generate entities associated with video 3010 according to a preset schedule (e.g., every two weeks) which may result in different entities being identified compared to previous entities identified by the entity generator 3020. Accordingly, different entity cards may be displayed in association with the video 3010 after the machine learning resource 3026 is updated or adjusted. The machine learning resource 3026 may also re-generate entities associated with video 3010 according to a user input request to the entity generator 3020.

The entity generator 3020 may output one or more entities which the machine learning resource 3026 determines or predicts is likely to be searched for by a user viewing the video to the entity card generator 3030. In response to receiving the one or more entities from the entity generator 30202, the entity card generator 3030 may be configured to generate an entity card for each of the one or more entities. For example, the entity card generator 3030 may be configured to obtain information regarding the entity from various sources based on the identity of the entity and associated metadata of the entity to populate the entity card with text and/or image(s) which provide more information about the entity. For example, the entity card generator 3030 may be configured to create or generate entity cards by obtaining information regarding the entity from various sources (e.g., from external content 400) to populate the entity card with text and/or image(s) which provide more information about the entity. For example, information regarding the entity may be obtained from one or more websites, an electronic service which provides summaries for topics, and the like. For example, entity card generator 3030 may store the generated entity cards in the entity card data store 390. For example, the entity cards may be limited to less than a predetermined length and/or size (e.g., less than 100 words). For example, the entity cards may include information including one or more of a title (e.g., a title which identifies the entity, such as the title of "Barack Obama"), a subtitle (e.g., "former President of the United States" with respect to the prior entity and title example of Barack Obama), and attribution information (to provide attribution to a source of the information). For example, an image that forms part or all of the entity card may be limited to a thumbnail image size, a specified resolution, etc. In some implementations, the entity card generator 3030 may correspond to entity card provider 334.

User interface entity card renderer 3040 may be configured to render an entity card which is to be provided for at least a portion of the user interface that is to be provided for display on the display 160 of the user computing device 100.

User interface generator 3050, which may correspond to user interface generator 330, may be configured to combine the video 3010 and the rendered entity card to generate the user interface that is to be provided for display on the display 160 of the user computing device 100. In some implementations, rendering of the entity card, or rendering of the user interface which includes at least the video and the entity card, may be performed at the user computing device 100. In some implementations, rendering of the entity card, or rendering of the user interface which includes at least the video and the entity card, may be performed at the server computing system 300.

Figures 4A, 4B:
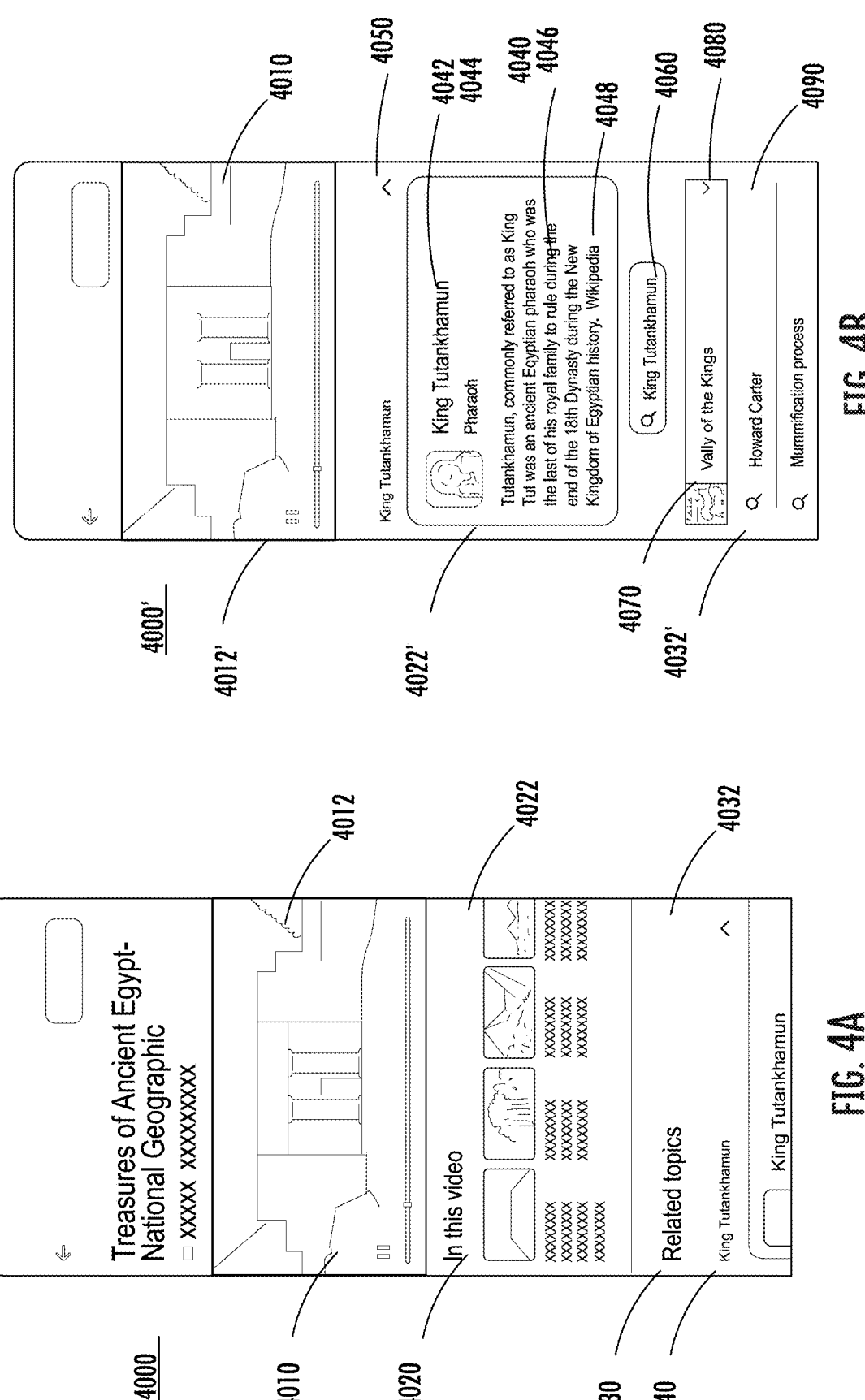
FIGS. 4A-4C depict example user interfaces in which one or more entity cards are presented during the display of a video, according to one or more example embodiments of the disclosure.
Figure 4C:
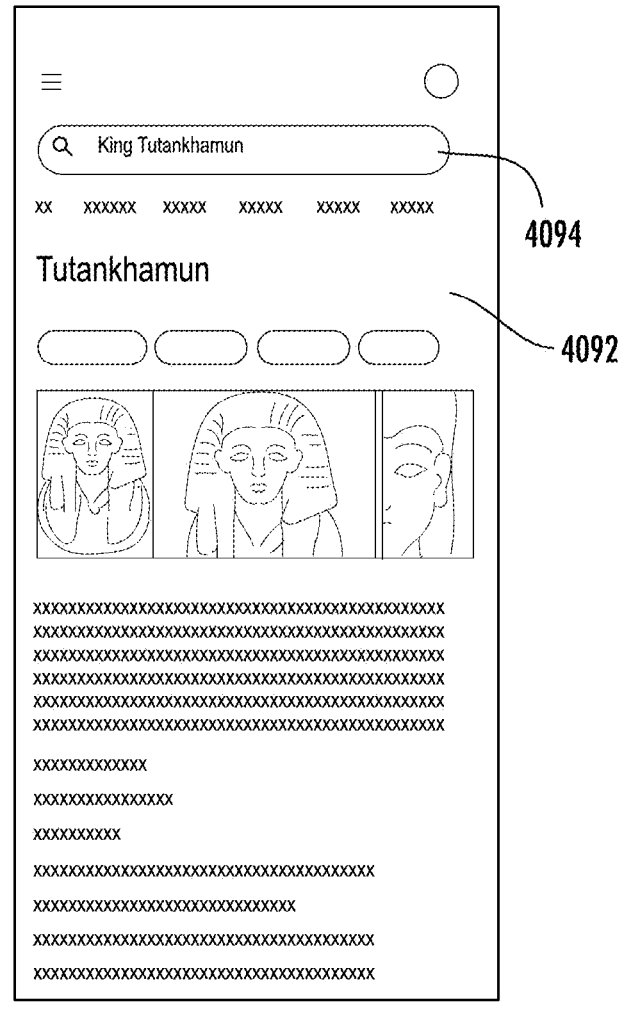

FIGS. 4A-4C depict example user interfaces in which one or more entity cards are presented during the display of a video, according to one or more example embodiments of the disclosure. Referring to FIG. 4A, an example user interface 4000 as displayed on a display 160 of user computing device 100 is shown. The user interface 4000 includes a section in which video 4010 is being played on a first portion 4012 of the user interface 4000. The user interface 4000 also includes a section entitled "In this video" 4020 displayed on a second portion 4022 of the user interface 4000 which summarizes content of the video 4010 at different time points during the video 4010. The user interface 4000 also includes a section entitled "Related topics" 4030 which includes an entity card 4040 displayed on a third portion 4032 of the user interface 4000. In this example, an entity which has been identified from the video 4010 is "King Tutankhamuh," and the entity card 4040 includes descriptive content relating to King Tutankhamuh including an image of the pharaoh and a textual summary regarding the pharaoh. For example, the entity may have been identified by applying a machine learning resource to identify one or more entities which are most likely to be searched for by a user viewing the video 4010, based on a transcription of content from the video 4010.

In some implementations, a user of the user computing device 100 may scroll down the user interface 4000 to view the content shown in the entity card 4040 in the third portion 4032. Referring to FIG. 4B, an example user interface 4000' as displayed on a display 160 of user computing device 100 is shown. For example, as shown in FIG. 4B, in response to a user scrolling down to view the entity card 4040, the video 4010 may be maintained (anchored) at an upper portion of the user interface 4000' on a first portion 4012' of the user interface 4000'. The user interface 4000' also includes the section entitled "Related topics" which includes the entity card 4040 displayed on a second portion 4022' of the user interface 4000'. In this example, the entity card 4040 includes a title 4042 (King Tutankhamuh) of the entity card 4040, a subtitle 4044 (Pharaoh), descriptive content 4046 (a textual summary and thumbnail image), and attribution 4048 which cites a source of the descriptive content 4046.

For example, in other portions of the user interface 4000' additional user interface elements and entity cards may be provided. For example, a suggested search query 4060 may be provided on the user interface 4000'. Here, the suggested search query 4060 corresponds to an entity search user interface element that, when selected, is configured to perform a search relating to the entity.

For example, in a third portion 4032' of the user interface 4000' a second entity card 4070 (Valley of the kings) is also displayed. Here, the second entity card 4070 is displayed in a contracted or collapsed form, in contrast to the entity card 4040 which is in an expanded form. The second entity card 4070 displayed in the contracted or collapsed form includes sufficient identifying information (e.g., the title of the entity card such as "Valley of the kings" and a thumbnail image relating to the Valley of the kings) so that a user understands what subject, concept, or topic the second entity card 4070 is concerned with. For example, a user may expand the second entity card 4070 by selecting a user interface element 4080 to obtain a fuller description of the second entity (the Valley of the kings), and a user may collapse the entity card 4040 by selecting a user interface element 4050.

For example, in the third portion 4032' of the user interface 4000' additional suggested search queries 4090 (e.g., "Howard carter" and "Mummification process") are also displayed. Here, the suggested search queries 4090 correspond to search query user interface elements that, when selected, are configured to perform a search relating to a topic of the video 4010 other than the first entity or the second entity (e.g., on a topic of the video other than any of the entities identified from the video 4010).

In example embodiments of the disclosure, the video 4010 continues to play while a user views the entity card 4040 and/or second entity card 4070. Therefore, viewing of the video 4010 is not interrupted when a user wishes to know more about an entity identified from the video 4010. The user may obtain sufficient information about the entity from the presented entity cards on the user interface 4000'.

In some implementations, the entity may be mentioned in the video 4010 at a first timepoint in the video 4010, and the entity card 4040 may be provided for display on a portion of the user interface (e.g., third portion 4032 of user interface 4000 or second portion 4022' of user interface 4000') at the first timepoint. Therefore, the entity card 4040 may be provided for display at a time which is synchronized with a discussion of the entity in the video 4010.

As shown in FIG. 4B, second entity card 4070 is displayed on a third portion 4032 of the user interface 4000' in a contracted form. The second entity card 4070 may identify or reference a second entity (Valley of the kings) to be mentioned in the video 4010 at a second timepoint in the video 4010 after the first timepoint. In some implementations, when the second entity is mentioned in the video 4010 at the second timepoint, the contracted second entity card 4070 may be automatically expanded to fully display the second entity card 4070 on the third portion 4032' of the user interface 4000' while the continuing to play the video 4010, the second entity card 4070 including descriptive content relating to the second entity. In some implementations, when the second entity is mentioned in the video 4010 at the second timepoint, the contracted second entity card 4070 may be automatically expanded to fully display the second entity card 4070 on the second portion 4022' of the user interface 4000' while the continuing to play the video 4010, the second entity card 4070 replacing the entity card 4040 on the user interface 4000' at a time when the second entity is mentioned in the video 4010 and including descriptive content relating to the second entity.

Referring to FIG. 4C, an example user interface 4000" as displayed on a display 160 of user computing device 100 is shown. User interface 4000" displays a search results page 4092 that is obtained in response to a user selecting the suggested search query 4060 provided on the user interface 4000'. The suggested search query 4060 corresponds to an entity search user interface element that, when selected, is configured to perform a search relating to the entity. In the example of FIG. 4C, the entity search is for the entity King Tutankhamun, and the search box 4092 is automatically populated with the entity, thereby relieving a user of having to spell the entity which could be spelled incorrectly by the user causing errors in the search results and leading to frustration on the part of the user as well as wasting computing resources on inefficient or erroneous searches.

As discussed above with respect to the example of FIGS. 4A-4C, in some implementations, all of the entity cards (e.g., entity card 4040 and second entity card 4070) associated with a video may be visible on the user interface to the user at a same time while the video is playing, or only some of the entity cards associated with the video may be visible on the user interface to the user at a same time while the video is playing. For example, one or more of the entity cards (e.g., entity card 4040 and/or second entity card 4070) may be fully expanded so that a user can view the entire contents of the entity card(s), while some or all of the remaining entity cards may be displayed on the user interface in a contracted or collapsed form. For example, in the contracted or collapsed form, the user may view a portion of the entity card and the portion of the entity card may include some identifying information (e.g., an identification of the corresponding entity) so that the user is able to comprehend the relevance of the entity card. For example, the user is able to select a user interface element or some portion of the visible portion of the collapsed entity card to expand the entity card to also view the hidden portion of the entity card for further information regarding the entity. In some implementations, the entity card may be automatically expanded to fully display the entity card on the user interface at a time when the corresponding entity is mentioned in the video. To save space on the user interface, a previously shown entity card may be changed to be in the contracted or collapsed form at the time the second entity card is expanded if it is not already in the contracted or collapsed form prior to the second entity card being displayed. In some implementations all of the entity cards may each be fully displayed on the user interface throughout the video.

Figures 5A, 5B:
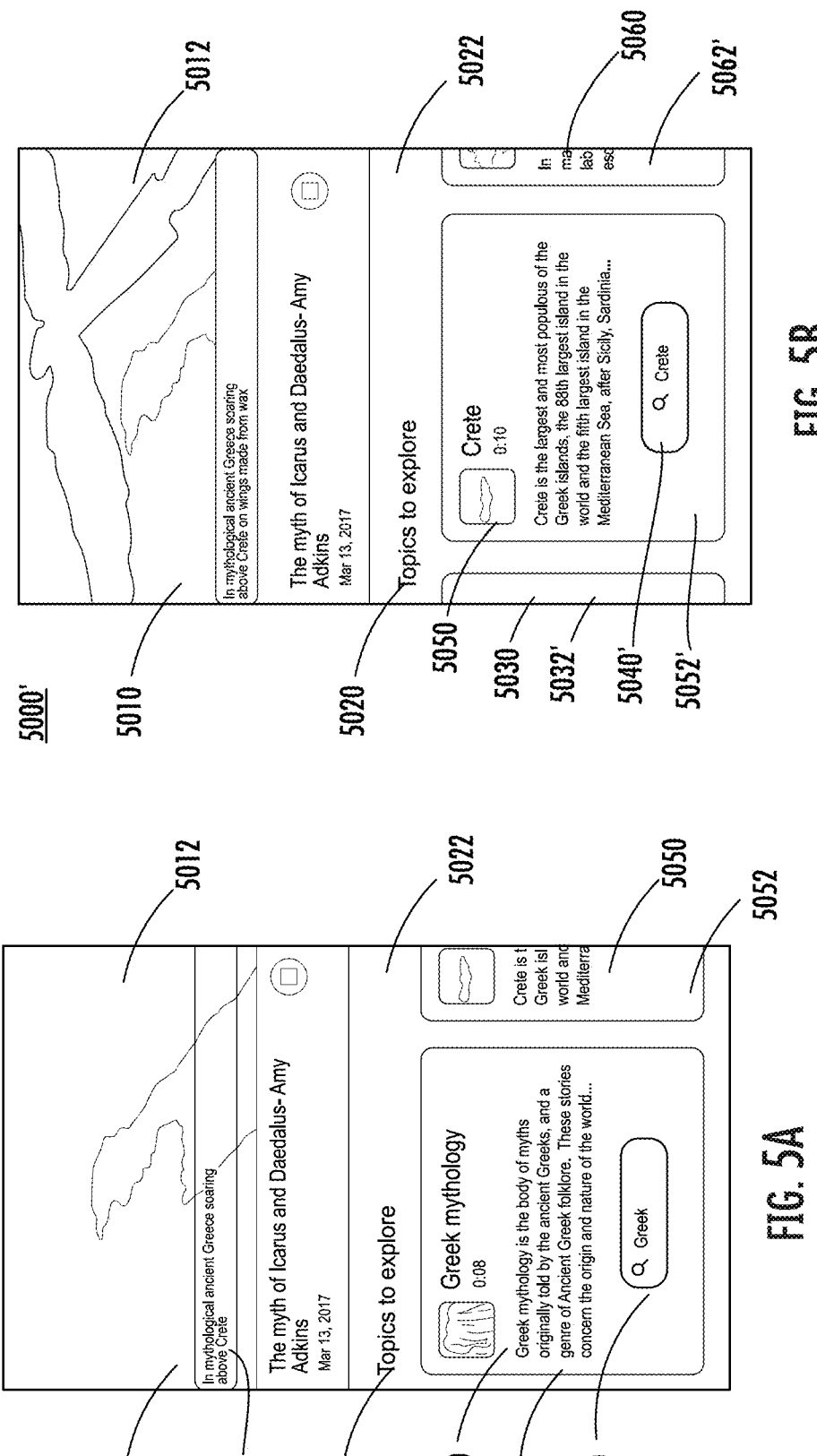
FIGS. 5A-5C depict example user interfaces in which entity cards are presented during the display of a video, according to one or more example embodiments of the disclosure.
Figure 5C:
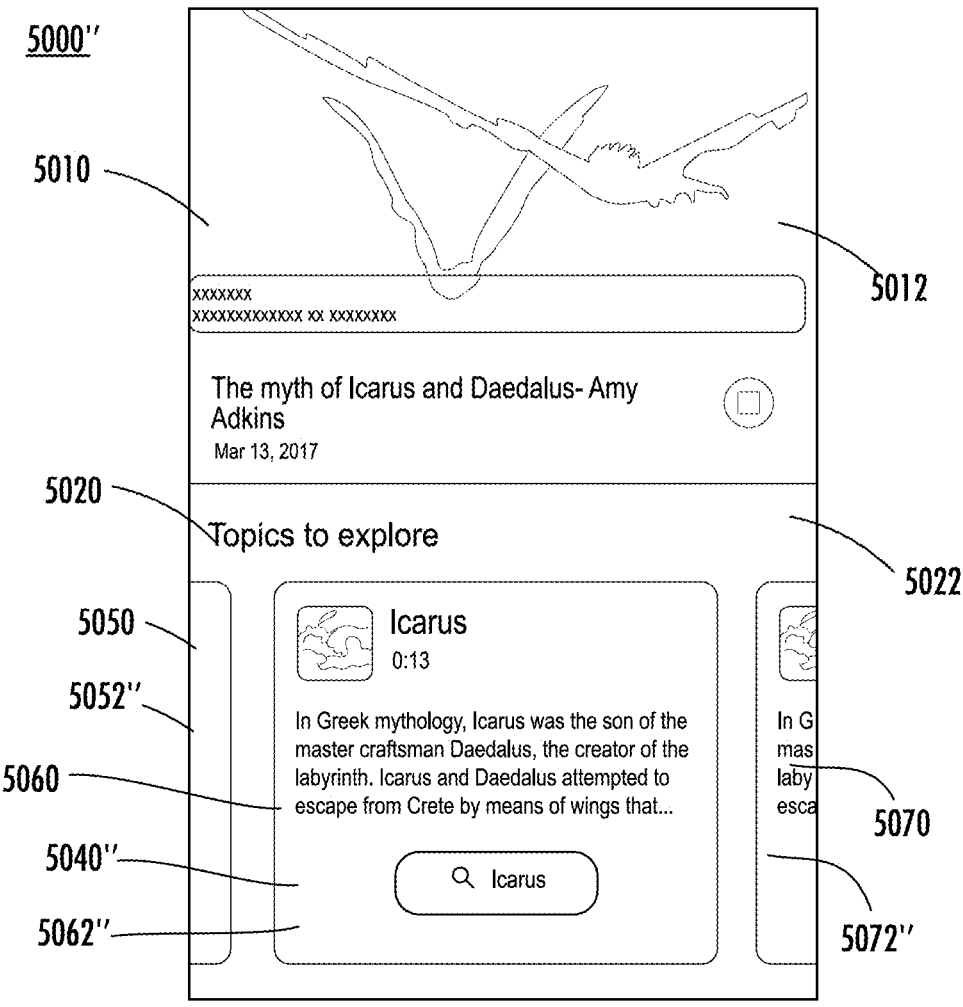

FIGS. 5A-5C depict example user interfaces in which entity cards are presented during the display of a video, according to one or more example embodiments of the disclosure. Referring to FIG. 5A, an example user interface 5000 as displayed on a display 160 of user computing device 100 is shown. The user interface 5000 includes a section in which video 5010 is being played on a first portion 5012 of the user interface 5000. For example, a transcript (i.e., closed captioning) 5014 of the audio portion of the video may be provided for display in the video 5010 displayed on the user interface 5000. The user interface 5000 also includes a section entitled "Topics to explore" 5020 displayed on a second portion 5022 of the user interface 5000 which includes one or more entity cards to be displayed at different time points during the video 5010. For example, the second portion 5022 may include a first sub-portion 5032 which includes first entity card 5030 and a second sub-portion 5052 which includes at least a portion of second entity card 5050.

In the example of FIG. 5A, a first entity which has been identified from the video 5010 is "Greek mythology," and the first entity card 5030 includes descriptive content relating to Greek mythology including an image which relates to Greek mythology and a textual summary regarding Greek mythology. For example, the first entity card 5030 may also include information regarding a timepoint in the video 5010 at which the first entity is being discussed (e.g., 8 seconds into the video 5010). For example, a second entity which has been identified from the video 5010 is "Crete," and the second entity card 5050 includes descriptive content relating to Crete including an image which relates to Crete and a textual summary regarding Crete. For example, the second entity card 5050 may also include information regarding a timepoint in the video 5010 at which the second entity is being discussed (e.g., 10 seconds into the video 5010).

For example, the first sub-portion 5032 may include one or more user interface elements. For example, a suggested search query 5040 may be provided on the first sub-portion 5032. Here, the suggested search query 5040 corresponds to an entity search user interface element that, when selected, is configured to perform a search relating to the entity (e.g., a search for the first entity "Greek mythology").

As shown in FIG. 5A, the second entity card 5050 is only partially shown on the user interface 5000 as the topic or concept regarding the second entity is yet to be discussed in the video 5010. For example, the entity cards in the second portion 5020 may rotate, for example in a carousel fashion, as each entity is being discussed while the video continues to play. Thus, the video 5010 continues to play while a user views the first entity card 5030 and second entity card 5050. Therefore, viewing of the video 5010 is not interrupted if a user wishes to know more about an entity identified from the video 5010 and obtains sufficient information about the entities from the presented entity cards on the user interface 5000 (or subsequent user interfaces 5000', 5000'', etc.) to understand the content of the video 5010 and need not perform a separate search and/or stop the video 5010.

Referring to FIG. 5B, an example user interface 5000' as displayed on a display 160 of user computing device 100 is shown. The user interface 5000' includes a section in which video 5010 is being played on a first portion 5012 of the user interface 5000'. The user interface 5000' also includes a section entitled "Topics to explore" 5020 displayed on a second portion 5022 of the user interface 5000' which includes one or more entity cards to be displayed at different time points during the video 5010. For example, the second portion 5022 may include a first sub-portion 5032' which includes at least a portion of first entity card 5030, a second sub-portion 5052' which includes second entity card 5050, and third sub-portion 5062' which includes at least a portion of third entity card 5060.

In the example of FIG. 5B, the second entity card 5050 includes descriptive content relating to Crete including an image which relates to Crete and a textual summary regarding Crete. For example, the second entity card 5050 may also include information regarding a timepoint in the video 5010 at which the second entity is being discussed (e.g., 10 seconds into the video 5010). For example, a third entity which has been identified from the video 5010 is "Icarus," and the third entity card 5060 includes descriptive content relating to Icarus including an image which relates to Icarus and a textual summary regarding Icarus. For example, the third entity card 5060 may also include information regarding a timepoint in the video 5010 at which the third entity is being discussed (e.g., 13 seconds into the video 5010 as shown in FIG. 5C).

For example, the second sub-portion 5052' may include one or more user interface elements. For example, a suggested search query 5040' may be provided on the second sub-portion 5052'. Here, the suggested search query 5040' corresponds to an entity search user interface element that, when selected, is configured to perform a search relating to the entity (e.g., a search for the second entity "Crete").

As shown in FIG. 5B, the first entity card 5030 and third entity card 5060 are only partially shown on the user interface 5000' as the topic or concept regarding the first entity has already been discussed in the video 5010 and the topic or concept regarding the third entity has yet to be discussed in the video 5010. For example, the entity cards in the second portion 5020 may rotate, for example in a carousel fashion, as each entity is being discussed while the video continues to play. Thus, the video 5010 continues to play while a user views the first entity card 5030, the second entity card 5050, and the third entity card 5060. Therefore, viewing of the video 5010 is not interrupted if a user wishes to know more about an entity identified from the video 5010 and obtains sufficient information about the entities from the presented entity cards on the user interfaces 5000, 5000', etc. to understand the content of the video 5010 and need not perform a separate search and/or stop the video 5010.

Referring to FIG. 5C, an example user interface 5000'' as displayed on a display 160 of user computing device 100 is shown. The user interface 5000'' includes a section in which video 5010 is being played on a first portion 5012 of the user interface 5000''. The user interface 5000'' also includes a section entitled "Topics to explore" 5020 displayed on a second portion 5022 of the user interface 5000'' which includes one or more entity cards to be displayed at different time points during the video 5010. For example, the second portion 5022 may include a first sub-portion 5052'' which includes at least a portion of second entity card 5050, a second sub-portion 5062'' which includes third entity card 5060, and third sub-portion 5072'' which includes at least a portion of fourth entity card 5070.

In the example of FIG. 5C, the third entity card 5060 includes descriptive content relating to Icarus including an image which relates to Icarus and a textual summary regarding Icarus. For example, the third entity card 5060 may also include information regarding a timepoint in the video 5010 at which the third entity is being discussed (e.g., 13 seconds into the video 5010). For example, a fourth entity which has been identified from the video 5010 may include "Daedalus," and the fourth entity card 5070 includes descriptive content relating to Daedalus including an image which relates to Daedalus and a textual summary regarding Daedalus. For example, the fourth entity card 5070 may also include information regarding a timepoint in the video 5010 at which the fourth entity is being discussed (e.g., 20 seconds into the video 5010).

For example, the second sub-portion 5062'' may include one or more user interface elements. For example, a suggested search query 5040'' may be provided on the second sub-portion 5062''. Here, the suggested search query 5040'' corresponds to an entity search user interface element that, when selected, is configured to perform a search relating to the entity (e.g., a search for the second entity "Icarus").

As shown in FIG. 5C, the second entity card 5050 and fourth entity card 5070 are only partially shown on the user interface 5000'' as the topic or concept regarding the second entity has already been discussed in the video 5010 and the topic or concept regarding the fourth entity has yet to be discussed in the video 5010. For example, the entity cards in the second portion 5020 may rotate, for example in a carousel fashion, as each entity is being discussed while the video continues to play. Thus, the video 5010 continues to play while a user views the first entity card 5030, the second entity card 5050, the third entity card 5060, the fourth entity card 5070, and so on. Therefore, viewing of the video 5010 is not interrupted if a user wishes to know more about an entity identified from the video 5010 and obtains sufficient information about the entities from the presented entity cards on the user interfaces 5000, 5000', 5000'', etc. to understand the content of the video 5010 and need not perform a separate search and/or stop the video 5010.

As discussed above with respect to the example of FIGS. 5A-5C, in some implementations, entity cards (e.g., entity cards 5030, 5050, 5060, 5070) associated with a video may be visible on the user interface to the user as the video progresses, and the user is not able to view an entity card fully until the corresponding entity is mentioned in the video. For example, a first entity card about a first entity may be displayed on the user interface at a time during the video when the first entity is mentioned in the video (e.g., at a first timepoint). The first entity card may be displayed for a predetermined amount of time while the video continues to play (e.g., for a time sufficient for an average user to read or view the content contained in the first entity card) or for a time until a next entity is mentioned in the video at which point another entity card is provided on the user interface. For example, a second entity card about a second entity may be displayed on the user interface at a time during the video when the second entity is mentioned in the video (e.g., at a second timepoint). In some implementations, the second entity card may be displayed on the user interface by replacing the first entity card (i.e., by occupying some or all of the space on the user interface which was previously occupied by the first entity card).

Figure 6B:
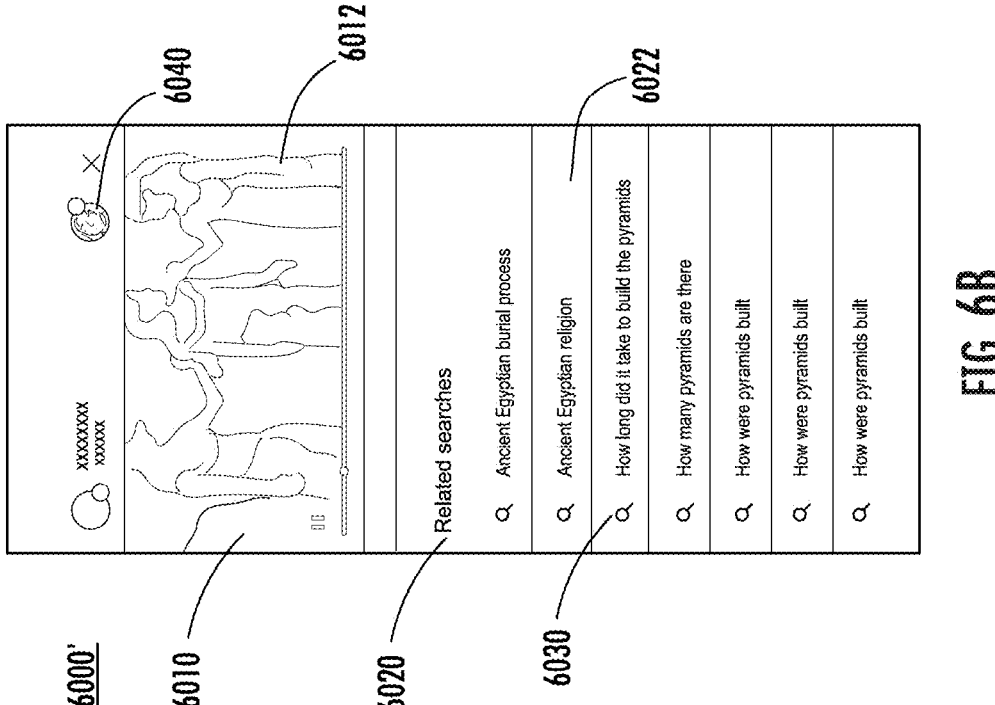
FIGS. 6A-6C depict example user interfaces in which a notification user interface element is presented for displaying one or more entity cards during the display of a video, according to one or more example embodiments of the disclosure.
Figure 6A:
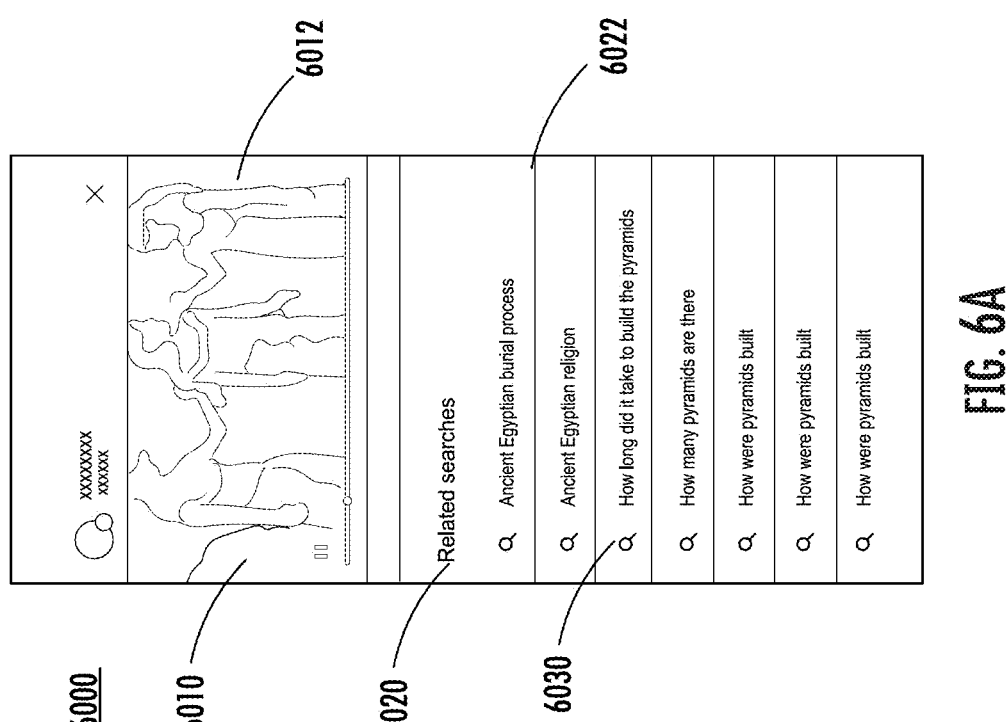
Figure 6C:
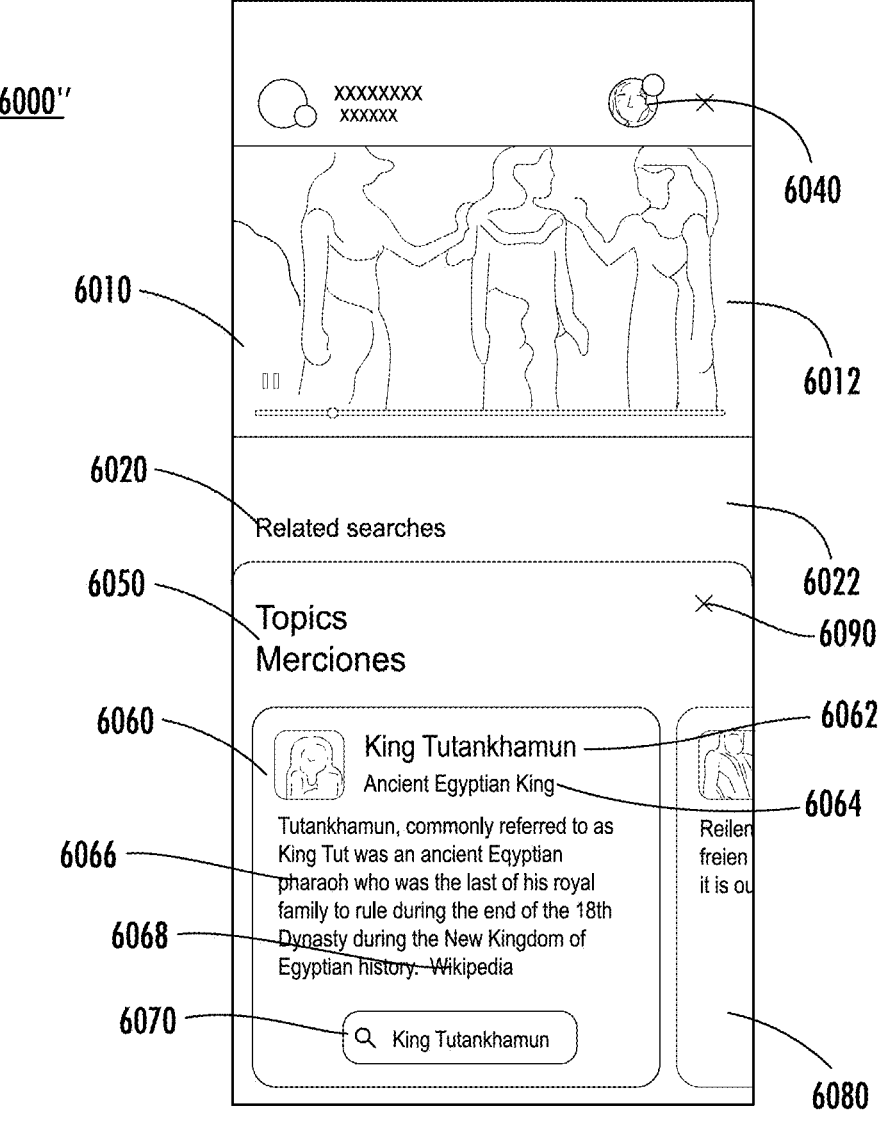

FIGS. 6A-6C depict example user interfaces in which a notification user interface element is presented for displaying one or more entity cards during the display of a video, according to one or more example embodiments of the disclosure. Referring to FIG. 6A, an example user interface 6000 as displayed on a display 160 of user computing device 100 is shown. The user interface 6000 includes a section in which video 6010 is being played on a first portion 6012 of the user interface 6000. The user interface 6000 also includes a section entitled "Related searches" 6020 displayed on a second portion 6022 of the user interface 6000 which includes one or more suggested search queries 6030 relating to the video 6010.

Referring to FIG. 6B, an example user interface 6000' as displayed on a display 160 of user computing device 100 is shown. The user interface 6000' has a similar configuration as the user interface 6000 of FIG. 6A, except that a notification user interface element 6040 is displayed in response to an entity (for which an entity card exists) being mentioned in the video 6010. For example, when an entity is mentioned in the video 6010 while the video 6010 is playing, the notification user interface element 6040 is displayed on the user interface 6000' while continuing to play the video 6010. For example, the notification user interface element 6040 indicates that additional information relating to the entity is available. In response to receiving a selection of the notification user interface element 6040, an entity card is displayed on the user interface while continuing to play the video 6010. The notification user interface element 6040 may include some identifying information (e.g., an identification of the corresponding entity and/or an image such as a thumbnail image) of the entity to further make the user aware that the notification user interface element 6040 is associated with the entity and so that the user is able to comprehend the relevance of the entity card which is available.

Referring to FIG. 6C, an example user interface 6000'' as displayed on a display 160 of user computing device 100 is shown. For example, user interface 6000' may be displayed in response to a user selecting the notification user interface element 6040 as displayed on user interface 6000'. The user interface 6000'' includes a section in which video 6010 is being played on a first portion 6012 of the user interface 6000. The user interface 6000 also includes a section entitled "Related searches" 6020 displayed on a second portion 6022 of the user interface 6000'', however the second portion 6022 is obscured by a new section entitled "Topics Mentioned" 6050 which is overlaid (e.g., as a pop-up window) on the second portion 6022.

The section entitled "Topics Mentioned" 6050 includes the entity card 6060 which is overlaid on the second portion 6022. In this example, the entity card 6060 includes a title 6062 (King Tutankhamuh) of the entity card 6060, a subtitle 6064 (Pharaoh), descriptive content 6066 (a textual summary and thumbnail image), and attribution 6068 which cites to a source of the descriptive content 6066.

For example, in other portions of the section entitled "Topics Mentioned" 6050 additional user interface elements and entity cards may be provided. For example, a suggested search query 6070 may be provided. Here, the suggested search query 6070 corresponds to an entity search user interface element that, when selected, is configured to perform a search relating to the entity. For example, at least a portion of a second entity card 6080 is also provided. The second entity card 6080 may be related to a next entity to be discussed during the video.

In some implementations, the notification user interface element 6040 may be displayed on the user interface 6000' at a same time that an entity is mentioned in the video 6010. In some implementations, the notification user interface element 6040 may be displayed on the user interface 6000' throughout the video 6010 and the selection of the notification user interface element 6040 may cause the section entitled "Topics Mentioned" 6050 to be displayed. For example, the section entitled "Topics Mentioned" 6050 is overlaid (e.g., as a pop-up window) on the second portion 6022 and may remain open until closed (e.g., via user interface element 6090). For example, the second entity card 6080 may be displayed fully (e.g., by replacing entity card 6060) at a time when the entity associated with the second entity card 6080 is discussed in the video 6010. That is, the display of the entity cards may be synchronized with a time that an associated entity is mentioned in the video. For example, entity cards may be displayed on the user interface every time that the associated entity is mentioned in the video, only the first time the entity is mentioned in the video, or selectively displayed when the entity is mentioned a plurality of times in the video.

As discussed above with respect to the example of FIGS. 6A-6C, in some implementations, the availability of entity cards associated with a video may be indicated while a video is playing using a notification user interface element, for example at a time that the associated entity is discussed during the video. Therefore, the user may have the option to view the entity card while viewing the video by deciding to select the notification user interface element.

Figures 7A, 7B:
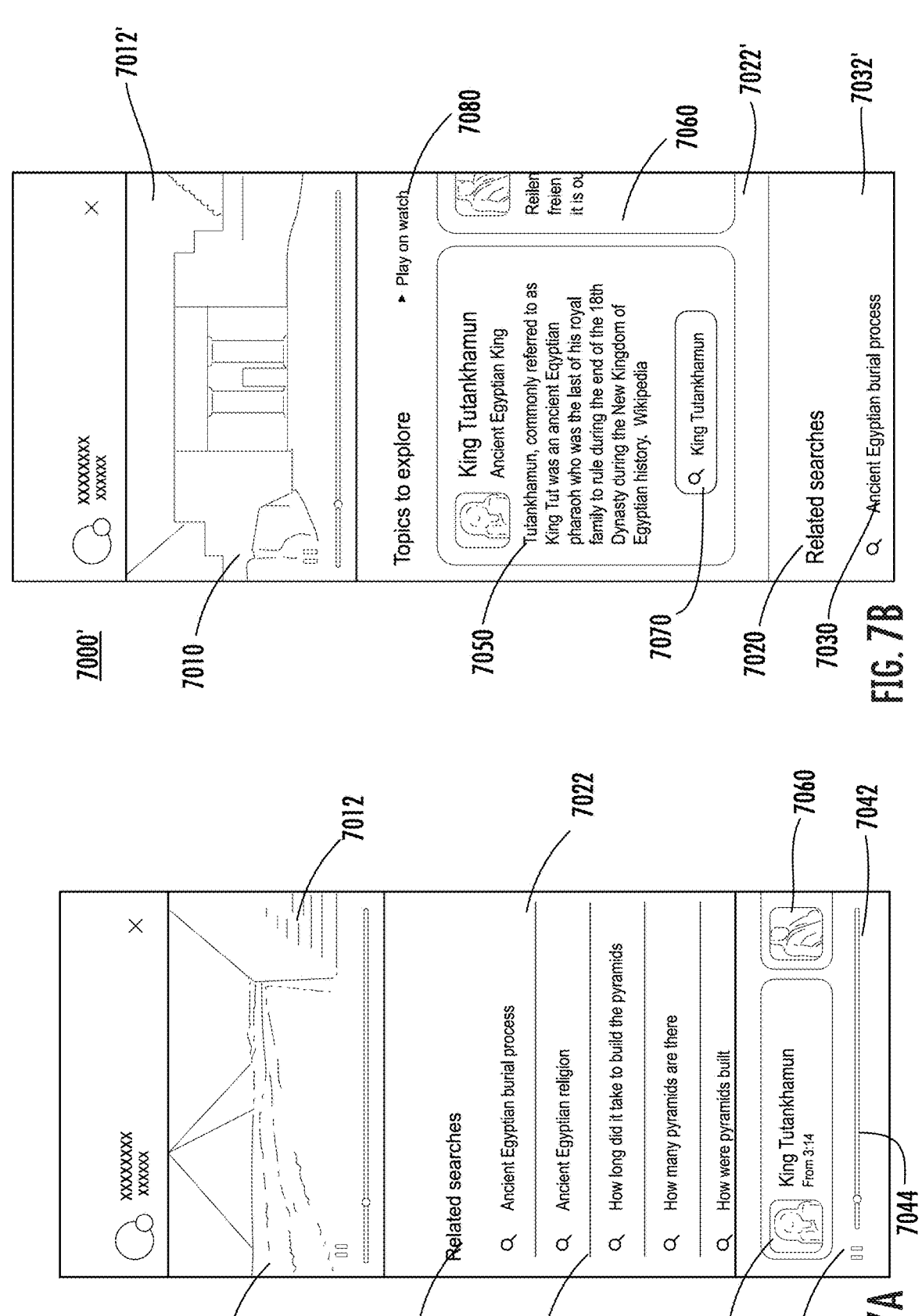
FIGS. 7A and 7B depict example user interfaces in which a timeline is presented for displaying one or more entity cards during the display of a video, according to one or more example embodiments of the disclosure.

FIGS. 7A and 7B depict example user interfaces in which a timeline is presented for displaying one or more entity cards during the display of a video, according to one or more example embodiments of the disclosure Referring to FIG. 7A, an example user interface 7000 as displayed on a display 160 of user computing device 100 is shown. For example, user interface 7000 includes a section in which video 7010 is being played on a first portion 7012 of the user interface 7000. The user interface 7000 also includes a section entitled "Related searches" 7020 displayed on a second portion 7022 of the user interface 7000 which includes one or more suggested search queries 7030 relating to the video 7010. The user interface 7000 further includes a persistent timeline section 7042 which is overlaid (e.g., as a pop-up window) on the second portion 7022 to obscure at least a portion of the second portion 7022.

The persistent timeline section 7042 includes a persistent timeline 7040, at least a portion of a first entity card 7050, and at least a portion of second entity card 7060. The persistent timeline 7040 may display a timeline of the video 7010 and include one or more points 7044 which indicate when an entity is to be discussed during the video 7010. For example, a next entity to be discussed (e.g., Howard Carter) can be indicated by at least a portion of second entity card

7060 being shown in the persistent timeline section 7042 and includes an image of the entity.

The first entity card 7050 and/or second entity card 7060 may be selectable such that the entity cards are expanded as shown in FIG. 7B, for example.

Referring to FIG. 7B, user interface 7000' may be displayed in response to a user selecting the first entity card 7050 as displayed on user interface 7000, or in some implementations the user interface 7000' may be displayed at a timepoint that the entity (King Tutankhamuh) is being discussed during the video 7010. In FIG. 7B, the user interface 7000' includes the video 7010 displayed on a first portion 7012' of the user interface 7000'. The user interface 7000' also includes a section entitled "Topics to explore" which includes the first entity card 7050 and at least a portion of the second entity card 7060 displayed on a second portion 7022' of the user interface 7000'. The user interface 7000' also includes the section entitled "Related searches" 7020 displayed on a third portion 7032' of the user interface 7000' which includes one or more suggested search queries 7030 relating to the video 7010.

As shown in FIG. 7B, the first entity card 7050 is expanded to include the descriptive content regarding the entity and, similar to the examples discussed previously, includes a title (King Tutankhamuh), a subtitle (Ancient Egyptian King), descriptive content (a textual summary and thumbnail image), and attribution which cites to a source of the descriptive content. Second entity card 7060 may be displayed at least partially next to the first entity card 7050 in the second portion 7022' of the user interface 7000'. A user interface element 7080 may be included in the user interface 7000' as a selectable element that, when selected, allows the entity cards associated with video 7010 to be cycled through, for example in a carousel fashion, as the video is played.

In some implementations, the section entitled "Topics to explore" may also include additional user interface elements. For example, a suggested search query 7070 may be provided. Here, the suggested search query 7070 corresponds to an entity search user interface element that, when selected, is configured to perform a search relating to the entity.

As discussed above with respect to the example of FIGS. 7A-7B, in some implementations, a persistent timeline section may be displayed while a video is being played to indicate to a user of available entity cards in the video. An entity card related to an entity being discussed currently may be displayed centrally (i.e., prominently) in the persistent timeline section while a next entity card for a next entity to be discussed during the video may also be provided. For example, the user is able to select the entity card as displayed in the persistent timeline section (e.g., in a contracted or collapsed form) to expand the entity card for further information regarding the entity. In some implementations, the entity card may be automatically expanded to fully display the entity card on the user interface at a time when the corresponding entity is mentioned in the video.

FIGS. 8-10 illustrate flow diagrams of example, non-limiting computer-implemented methods according to one or more example embodiments of the disclosure.

Referring to FIG. 8, the method 800 includes operation 810 of a user computing device (e.g., user computing device 100) displaying a video on a first portion of a user interface which is displayed on a display 160 of the user computing device 100. At operation 820, when a first entity is mentioned in the video while the video is playing, the user interface displays a first entity card on a second portion of the user interface while continuing to play the video, the first entity card including descriptive content relating to the first entity. For example, the first entity card has been generated in response to automatic recognition of the first entity from a transcription of content of the video.

Referring to FIG. 9, the method 900 includes operation 910 of a server computing system (e.g., server computing system 300) obtaining a transcription of content from a video (e.g., via automatic speech recognition). At operation 920, the method includes applying a machine learning resource to identify one or more entities which are most likely to be searched for by a user viewing the video, based on the transcription of the content. For example, in a video about ancient Egypt, identified entities may include the "valley of the kings," "King Tutankhamuh," and "sarcopha-gus." At operation 930, the method includes generating one or more entity cards for each of the one or more entities, each of the one or more entity cards including descriptive content relating to a respective entity among the one or more entities. At operation 940, the method includes providing (or generating) a user interface, to be displayed on a respective display of one or more user computing devices, to: play the video on a first portion of the user interface, and when the video is played and a first entity among the one or more entities is mentioned in the video, display a first entity card on a second portion of the user interface, the first entity card including descriptive content relating to the first entity.

Referring to FIG. 10, the method 1000 includes operation 1010 of a server computing system (e.g., server computing system 300) obtaining a transcription of content from a video (e.g., via automatic speech recognition). At operation 1020, the method includes associating text from the tran-scription with a knowledge graph to obtain a collection of knowledge graph entities. At operation 1030, the method includes obtaining training data to build a machine learning model for the machine learning resource by identifying (or matching) knowledge graph entities with entities that appear in actual search queries of users watching the video. At operation 1040, the method includes weighing entities based on a relevance of the entity to other entities in the video, broadness of the entity, relevance of the entity to the topic of the video, and the like. For example, the machine learning resource may be trained by applying weights to candidate entities (e.g., a higher weight may be assigned to an entity the more often the term is mentioned in the video, a lower weight may be assigned to an entity which is overly broad and appears frequently in a corpus of videos, a higher weight may be assigned to an entity the more related it is to the topic of the video, etc.). At operation 1050, the method includes applying the machine learning resource to evaluate candi-date entities from among candidate entities identified in the video and to rank the candidate entities. At operation 1060, the method includes the machine learning resource predict-ing one or more entities for which entity cards are to be generated for the video. For example, the machine learning resource may select a predetermined number of entities (e.g., three or four) which are the highest ranked candidate entities as entities for which entity cards are to be generated. For example, the machine learning resource may select those entities which are predicted (e.g., with a specified confidence level, with a probability of being searched above a threshold level, etc.) to be searched by a user. The identified entities may subsequently be provided to an entity card generator for generating entity cards and/or the identified entities may be stored in a database (e.g., entity data store 380).

Terms such as "module", "unit," "provider," and "gen-erator" may be used herein in association with various features of the disclosure. Such terms may refer to, but are not limited to, a software or hardware component or device, such as a Field Programmable Gate Array (FPGA) or Application Specific Integrated Circuit (ASIC), which per-forms certain tasks. A module or unit may be configured to reside on an addressable storage medium and configured to execute on one or more processors. Thus, a module or unit may include, by way of example, components, such as software components, object-oriented software components, class components and task components, processes, func-tions, attributes, procedures, subroutines, segments of pro-gram code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in computer-readable media (e.g., non-transitory computer-readable media) including program instructions to implement various operations embodied by a computer. The media may also include, alone or in combi-nation with the program instructions, data files, data struc-tures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be config-ured to act as one or more software modules in order to perform the operations of the above-described embodi-ments, or vice versa. In addition, a non-transitory computer-readable storage medium may be distributed among com-puter systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the func-tionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifica-tions, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computer-implemented method, comprising:
receiving a video;
implementing one or more machine-learned models to:
identify a plurality of entities from the video, wherein the one or more machine-learned models are trained to identify a training entity from a training video based on at least one of a number of times the training entity is mentioned in the training video, a relevance of the training entity to a topic in the training video, or a number of times the training entity appears across a corpus of training videos,
rank the plurality of entities, wherein the one or more machine-learned models are trained to rank the training entity identified in the training video based on at least one of a likelihood that the training entity is to be searched for when the training video is viewed, the number of times the training entity is mentioned in the training video, the relevance of the training entity to the topic in the training video, or the number of times the training entity appears across the corpus of training videos, and
generate, based on the rank of the plurality of entities, a first entity card which includes descriptive content relating to a first entity from among the plurality of entities, wherein the first entity corresponds to one or more entities which are ranked highest among the plurality of entities;
providing, for presentation on a display device, the video; and
providing, for presentation on the display device while the video is being played, the first entity card, in response to the first entity being mentioned in the video.

2. The computer-implemented method of claim 1, wherein implementing the one or more machine-learned models to identify the plurality of entities includes:
obtaining training data to train the one or more machine-learned models based on observational data of users conducting searches in response to viewing the video.

3. The computer-implemented method of claim 1, wherein implementing the one or more machine-learned models to identify the plurality of entities further includes:
identifying the plurality of entities from the video by associating text from a transcription of the video with a knowledge graph, and
ranking the plurality of entities, based on one or more of:
a relevance of each of the plurality of entities to a topic of the video,
a relevance of each of the plurality of entities to one or more other entities among the plurality of entities,
a number of mentions of each entity in the video among the plurality of entities, and
a number of videos in which each entity among the plurality of entities appears across a corpus of videos stored in one or more databases.

4. The computer-implemented method of claim 3, wherein implementing the one or more machine-learned models to identify the plurality of entities further includes:
evaluating user interactions with the first entity card, and
determining at least one adjustment to the one or more machine-learned models based on the evaluating.

5. The computer-implemented method of claim 1, wherein the first entity is mentioned in the video at a first timepoint in the video, and
the first entity card is provided for presentation on the display device at the first timepoint.

6. The computer-implemented method of claim 1, wherein the one or more entities include a second entity, and the method further comprises:
implementing the one or more machine-learned models to generate, based on the rank of the plurality of entities, a second entity card which includes descriptive content relating to the second entity;
providing, for presentation on the display device while the video is being played and before the second entity is mentioned in the video, the second entity card in a contracted form, the second entity card in the contracted form referencing the second entity; and
providing, for presentation on the display device while the video is being played and in response to the second entity being mentioned in the video, the second entity card in a fully expanded form, the second entity card in the fully expanded form including descriptive content relating to the second entity.

7. The computer-implemented method of claim 1, wherein the one or more entities include a second entity, and the method further comprises:
implementing the one or more machine-learned models to generate, based on the rank of the plurality of entities, a second entity card which includes descriptive content relating to the second entity; and
providing, for presentation on the display device while the video is being played, the second entity card, by replacing the first entity card at a time when the second entity is mentioned in the video, the second entity card including descriptive content relating to the second entity.

8. The computer-implemented method of claim 1, further comprising:
providing, for presentation on the display device while the video is being played, a notification user interface element in response to the first entity being mentioned in the video, the notification user interface element indicating additional information relating to the first entity is available; and
providing, for presentation on the display device while the video is being played, the first entity card, in response to the first entity being mentioned in the video and in response to receiving a selection of the notification user interface element.

9. The computer-implemented method of claim 1, wherein the first entity card includes at least one of a textual summary providing information relating to the first entity or an image relating to the first entity.

10. A computing device, comprising:
a display device;
one or more memories to store instructions; and
one or more processors to execute the instructions stored in the one or more memories to perform operations, the operations including:
receiving a video;
implementing one or more machine-learned models to:
identify a plurality of entities from the video, wherein the one or more machine-learned models are trained to identify a training entity from a training video based on at least one of a number of times the training entity is mentioned in the training video, a relevance of the training entity to a topic in the training video, or a number of times the training entity appears across a corpus of training videos, rank the plurality of entities, wherein the one or more machine-learned models are trained to rank the training entity identified in the training video based on at least one of a likelihood that the training entity is to be searched for when the training video is viewed, the number of times the training entity is mentioned in the training video, the relevance of the training entity to the topic in the training video, or the number of times the training entity appears across the corpus of training videos, and generate, based on the rank of the plurality of entities, a first entity card which includes descriptive content relating to a first entity from among the plurality of entities, wherein the first entity corresponds to one or more entities which are ranked highest among the plurality of entities;

providing, for presentation on a display device, the video; and providing, for presentation on the display device while the video is being played, the first entity card, in response to the first entity being mentioned in the video.

11. The computing device of claim 10, wherein the first entity is mentioned in the video at a first timepoint in the video, and the first entity card is provided for presentation on the display device at the first timepoint.

12. The computing device of claim 10, wherein the one or more entities include a second entity, and the operations further include:

implementing the one or more machine-learned models to generate, based on the rank of the plurality of entities, a second entity card which includes descriptive content relating to the second entity;

providing, for presentation on the display device while the video is being played and before the second entity is mentioned in the video, the second entity card in a contracted form, the second entity card in the contracted form referencing the second entity; and providing, for presentation on the display device while the video is being played and in response to the second entity being mentioned in the video, the second entity card in a fully expanded form, the second entity card in the fully expanded form including descriptive content relating to the second entity.

13. The computing device of claim 10, wherein the one or more entities include a second entity, and the operations further include:

implementing the one or more machine-learned models to generate, based on the rank of the plurality of entities, a second entity card which includes descriptive content relating to the second entity; and providing, for presentation on the display device while the video is being played, the second entity card, by replacing the first entity card at a time when the second entity is mentioned in the video, the second entity card including descriptive content relating to the second entity.

14. The computing device of claim 10, further comprising providing for presentation on the display device, one or more first entity search user interface elements that, when selected, are configured to perform a search relating to the first entity.

15. The computing device of claim 10, wherein the one or more machine-learned models are trained based on observational data of users conducting searches in response to viewing the video.

16. The computing device of claim 10, wherein the plurality of entities are ranked based on a prediction as to which entities among the plurality of entities are most likely to be searched for by a user viewing the video.

17. The computing device of claim 16, wherein the one or more machine-learned models are configured to re-identify the plurality of entities from the video according to a preset schedule.

18. The computing device of claim 10, wherein the operations further include:

providing, for presentation on the display device while the video is being played, a notification user interface element in response to the first entity being mentioned in the video, the notification user interface element indicating additional information relating to the first entity is available; and providing, for presentation on the display device while the video is being played, the first entity card, in response to the first entity being mentioned in the video and in response to receiving a selection of the notification user interface element.

19. The computing device of claim 10, wherein the first entity card includes a textual summary providing information relating to the first entity and/or an image relating to the first entity.

20. A non-transitory computer readable medium storing instructions which, when executed by a processor, cause the processor to perform operations, the operations comprising:

receiving a video;

implementing one or more machine-learned models to:

identify a plurality of entities from the video, wherein the one or more machine-learned models are trained to identify a training entity from a training video based on at least one of a number of times the training entity is mentioned in the training video, a relevance of the training entity to a topic in the training video, or a number of times the training entity appears across a corpus of training videos, rank the plurality of entities, wherein the one or more machine-learned models are trained to rank the training entity identified in the training video based on at least one of a likelihood that the training entity is to be searched for when the training video is viewed, the number of times the training entity is mentioned in the training video, the relevance of the training entity to the topic in the training video, or the number of times the training entity appears across the corpus of training videos and generate, based on the rank of the plurality of entities, a first entity card which includes descriptive content relating to a first entity from among the plurality of entities, wherein the first entity corresponds to one or more entities which are ranked highest among the plurality of entities;

providing, for presentation on a display device, the video; and providing, for presentation on the display device while the video is being played, the first entity card, in response to the first entity being mentioned in the video.

* * * * *